United States Patent
Arora et al.

(10) Patent No.: US 11,010,172 B2
(45) Date of Patent: *May 18, 2021

(54) SOFTWARE UPGRADE AND DISASTER RECOVERY ON A COMPUTING DEVICE

(71) Applicant: Verizon Patent and Licensing Inc., Washington, DC (US)

(72) Inventors: Deepak Arora, Cupertino, CA (US); Kevin Meier, Belmont, CA (US); Timothy Perrett, Santa Clara, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/813,225

(22) Filed: Mar. 9, 2020

(65) Prior Publication Data

US 2020/0210204 A1 Jul. 2, 2020

Related U.S. Application Data

(63) Continuation of application No. 15/279,971, filed on Sep. 29, 2016, now Pat. No. 10,606,605.

(51) Int. Cl.
*G06F 9/44* (2018.01)
*G06F 9/4401* (2018.01)
*G06F 8/65* (2018.01)

(52) U.S. Cl.
CPC ............ *G06F 9/4408* (2013.01); *G06F 8/65* (2013.01)

(58) Field of Classification Search
CPC .................................... G06F 1/32; G06F 9/44
See application file for complete search history.

(56) References Cited

U.S. PATENT DOCUMENTS

| | | | |
|---|---|---|---|
| 7,430,683 B2* | 9/2008 | Zimmer | G06F 11/0706 714/2 |
| 2002/0162052 A1* | 10/2002 | Lewis | G06F 9/4406 714/36 |
| 2006/0085666 A1 | 4/2006 | Stakutis et al. | |
| 2006/0129795 A1 | 6/2006 | Bulusu et al. | |
| 2006/0136705 A1* | 6/2006 | Kaimal | G06F 21/64 713/2 |
| 2008/0301424 A1 | 12/2008 | Barajas et al. | |
| 2010/0131694 A1 | 5/2010 | Kelly et al. | |
| 2014/0173268 A1* | 6/2014 | Hashimoto | G11C 29/52 713/2 |
| 2014/0310698 A1* | 10/2014 | Lee | G06F 8/654 717/168 |
| 2014/0325496 A1 | 10/2014 | Son | |

* cited by examiner

*Primary Examiner* — Keshab R Pandey

(57) ABSTRACT

A method, a device, and a non-transitory storage medium provide to execute a first stage boot loader during a boot-up of the device; determine whether a disaster recovery service is invoked based on the first stage boot loader reading a first file that indicates whether the disaster recovery service was invoked during a previous cycle of the device and detecting a position of a button of the device; execute a second stage boot loader in response to a determination that the disaster recovery service is invoked; again determine whether the disaster recovery service is invoked; and reboot in response to a determination that the disaster recovery service is not invoked.

20 Claims, 21 Drawing Sheets

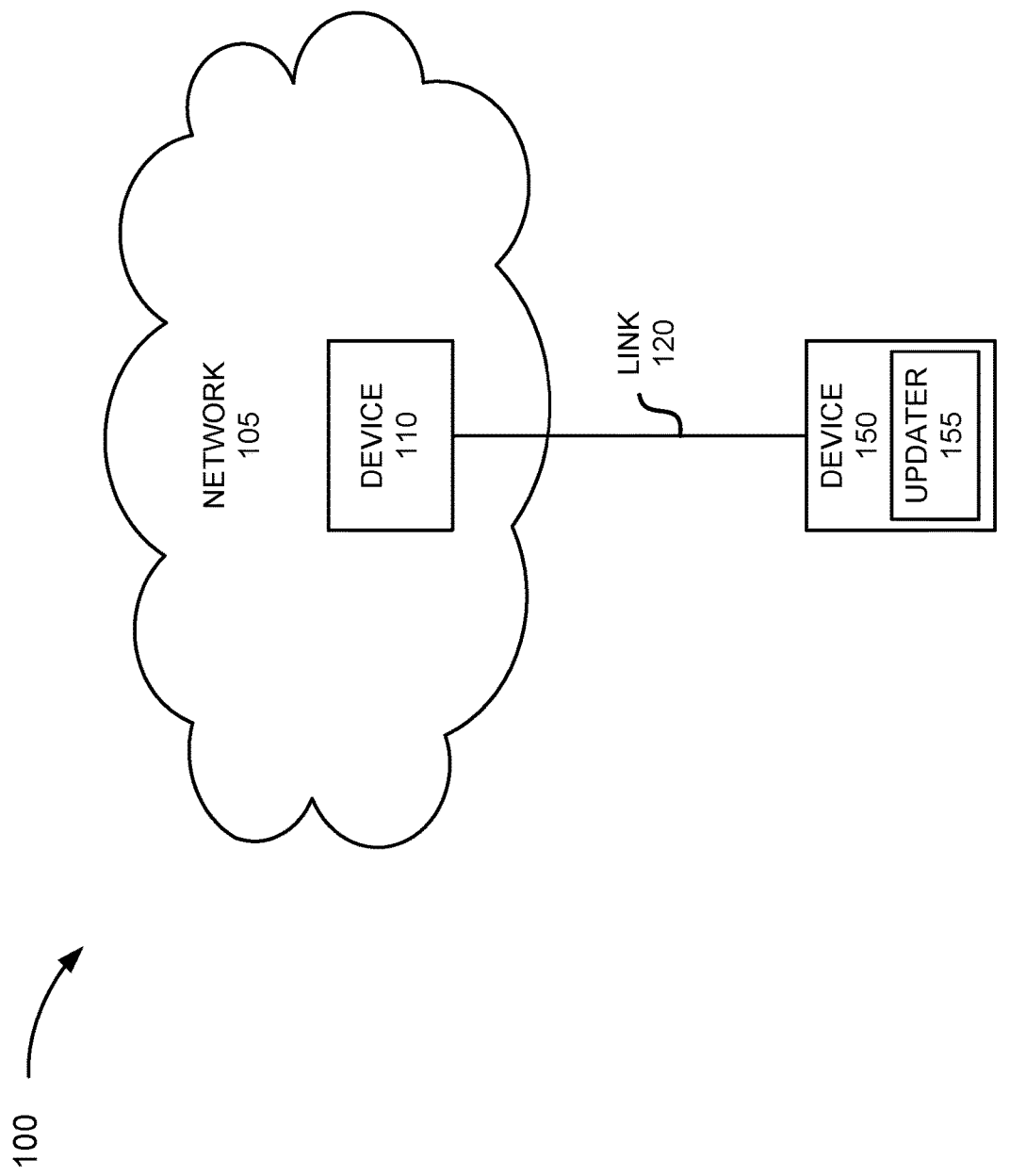

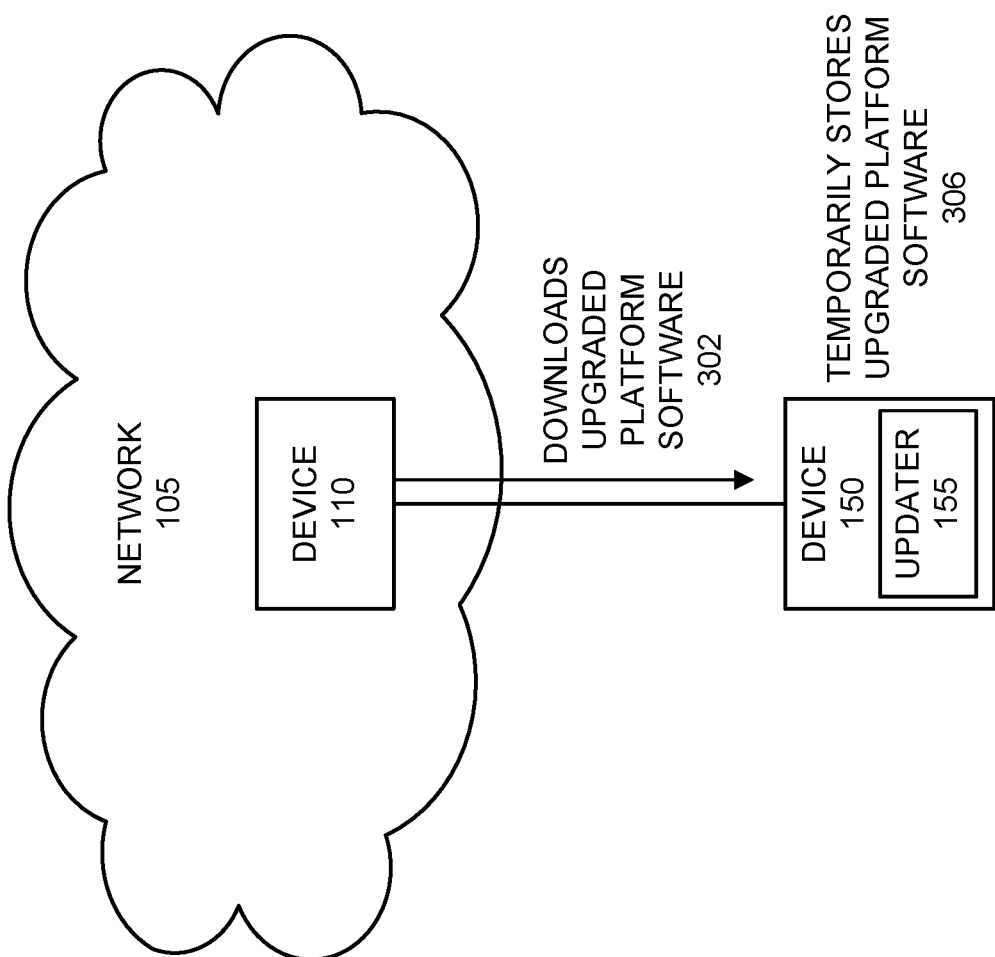

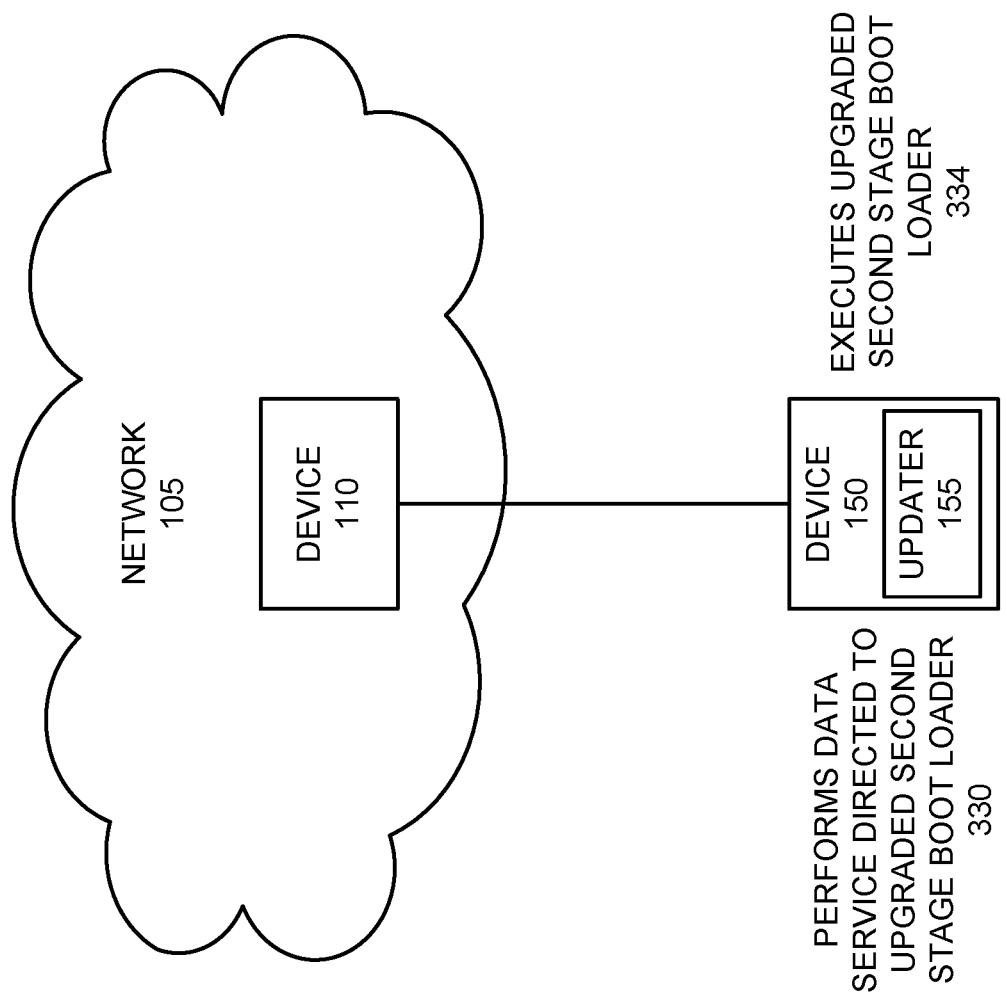

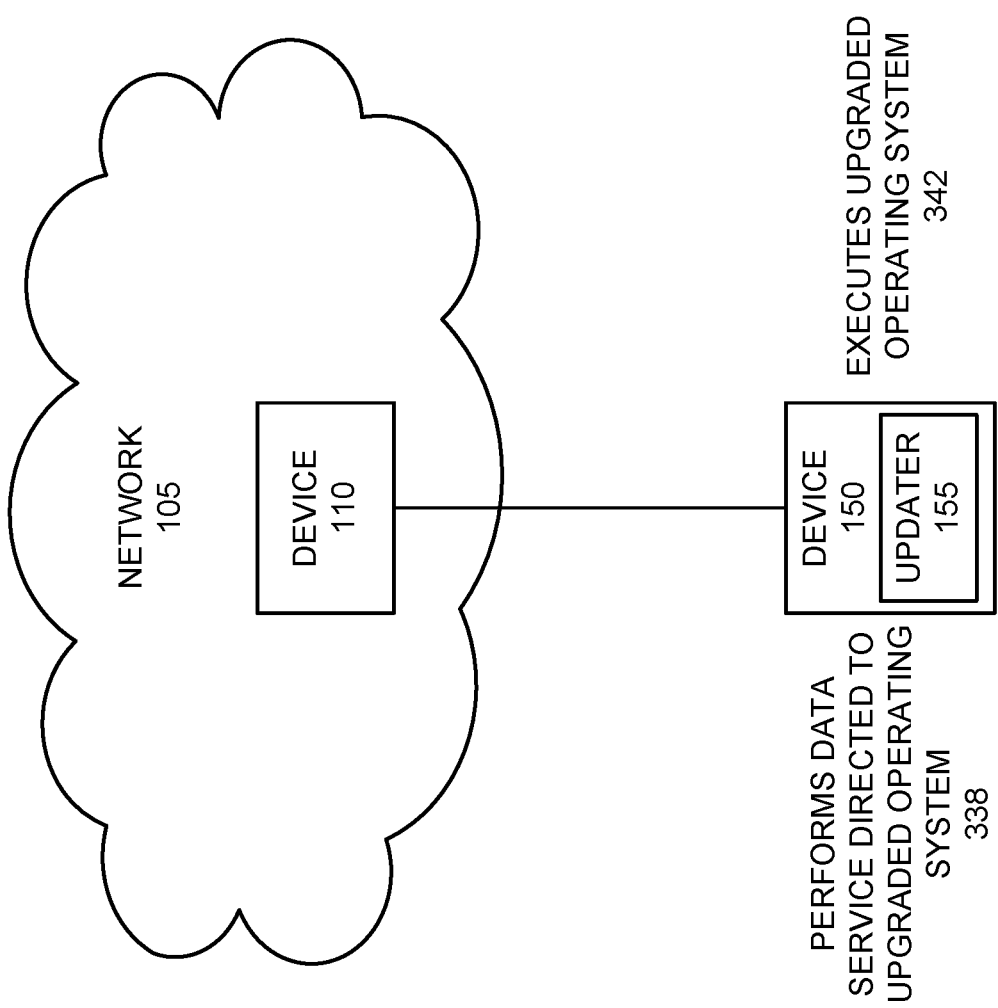

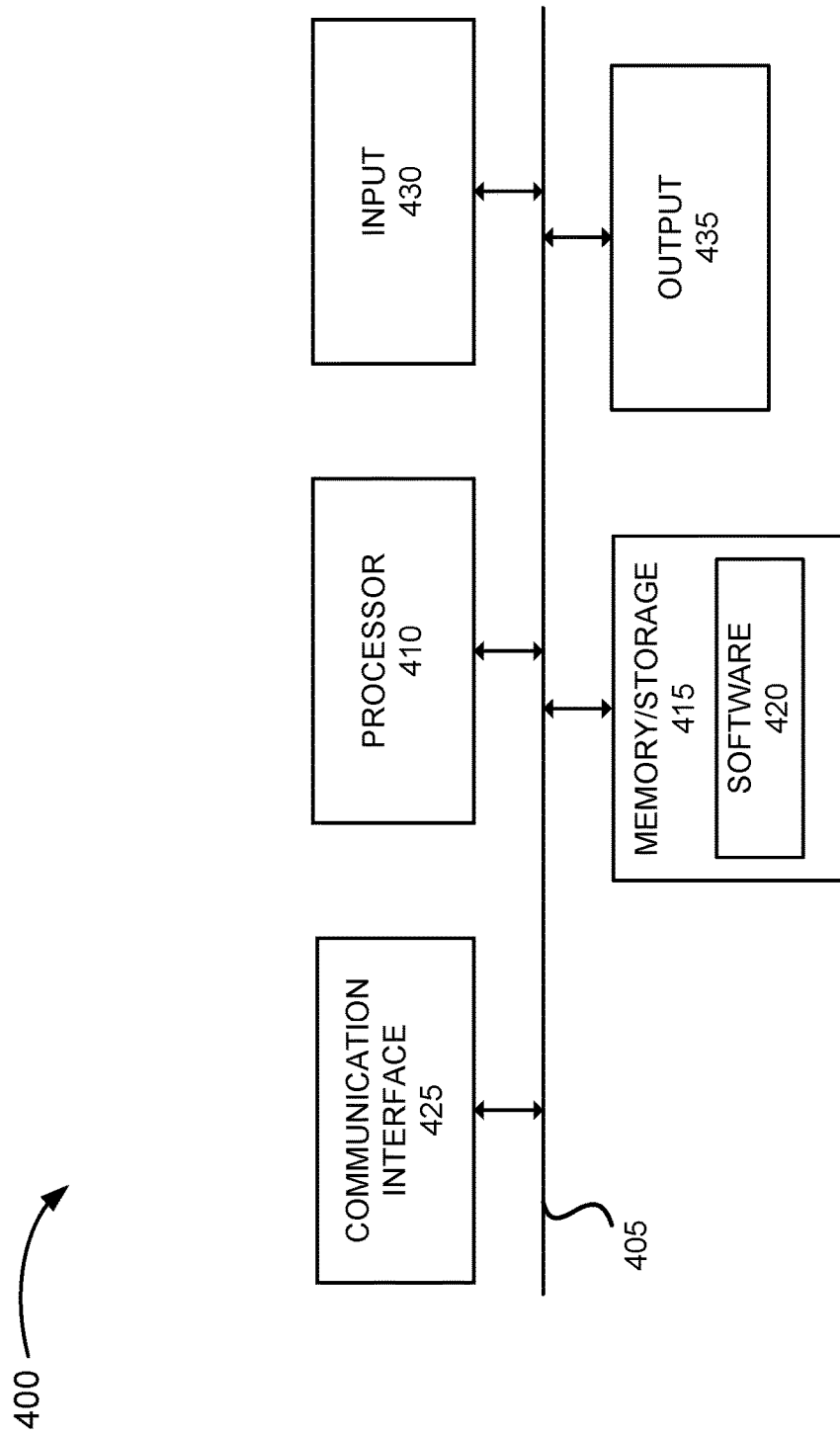

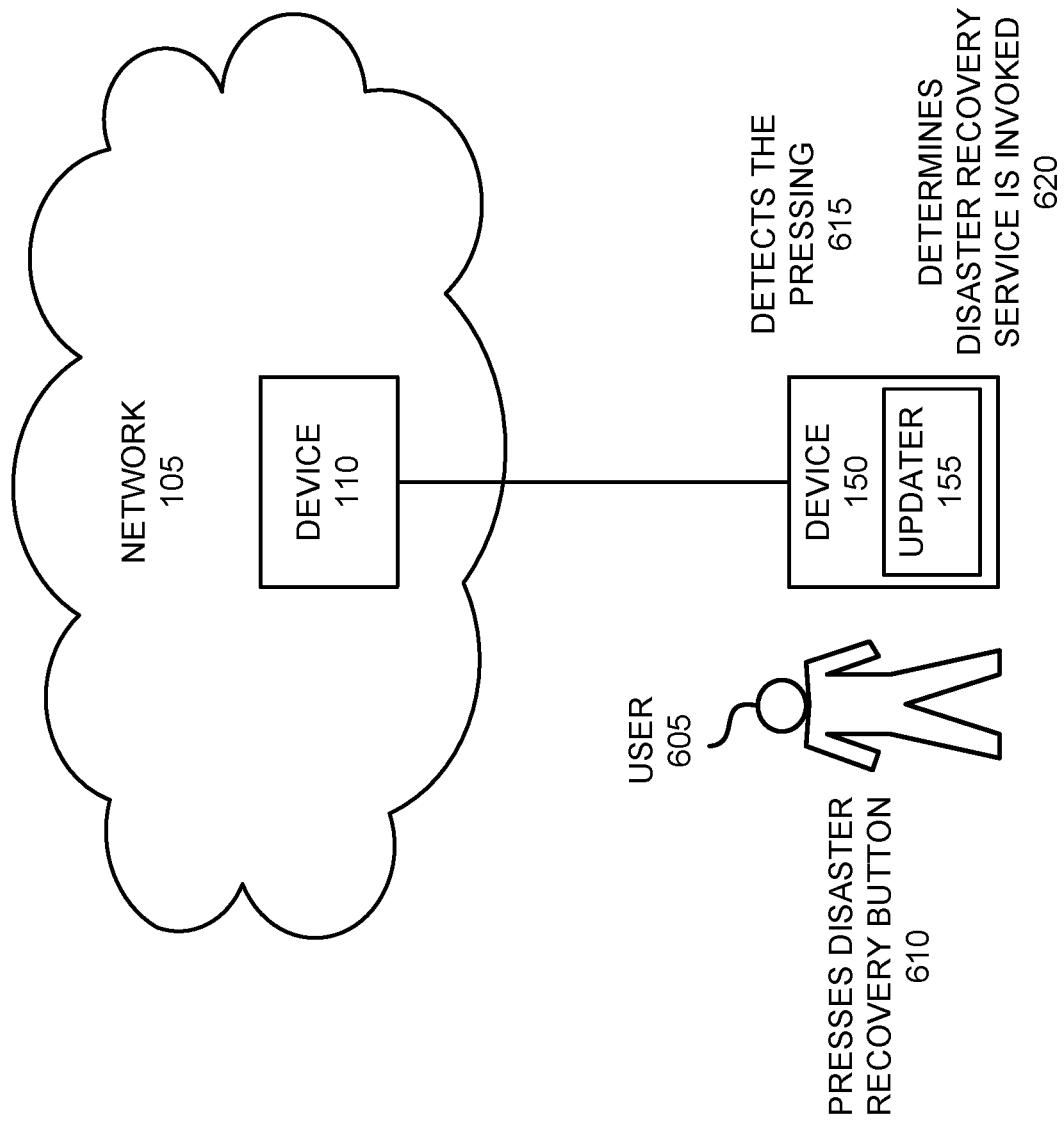

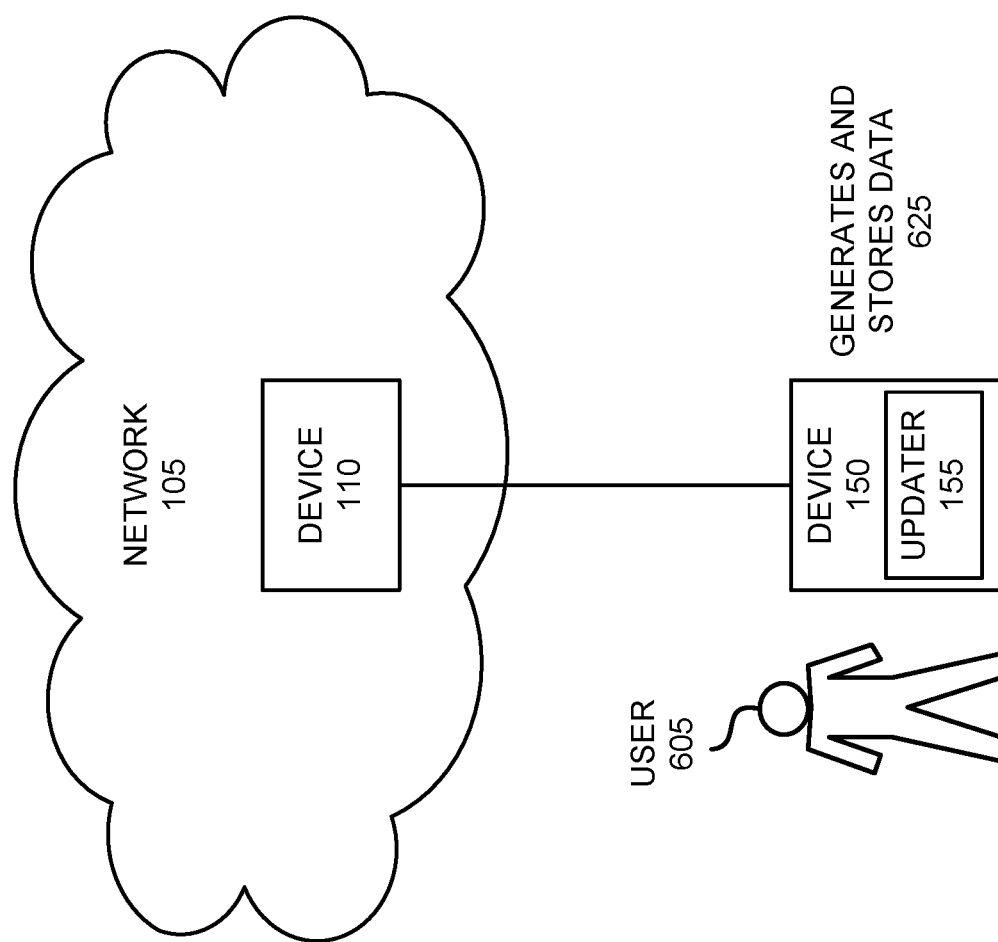

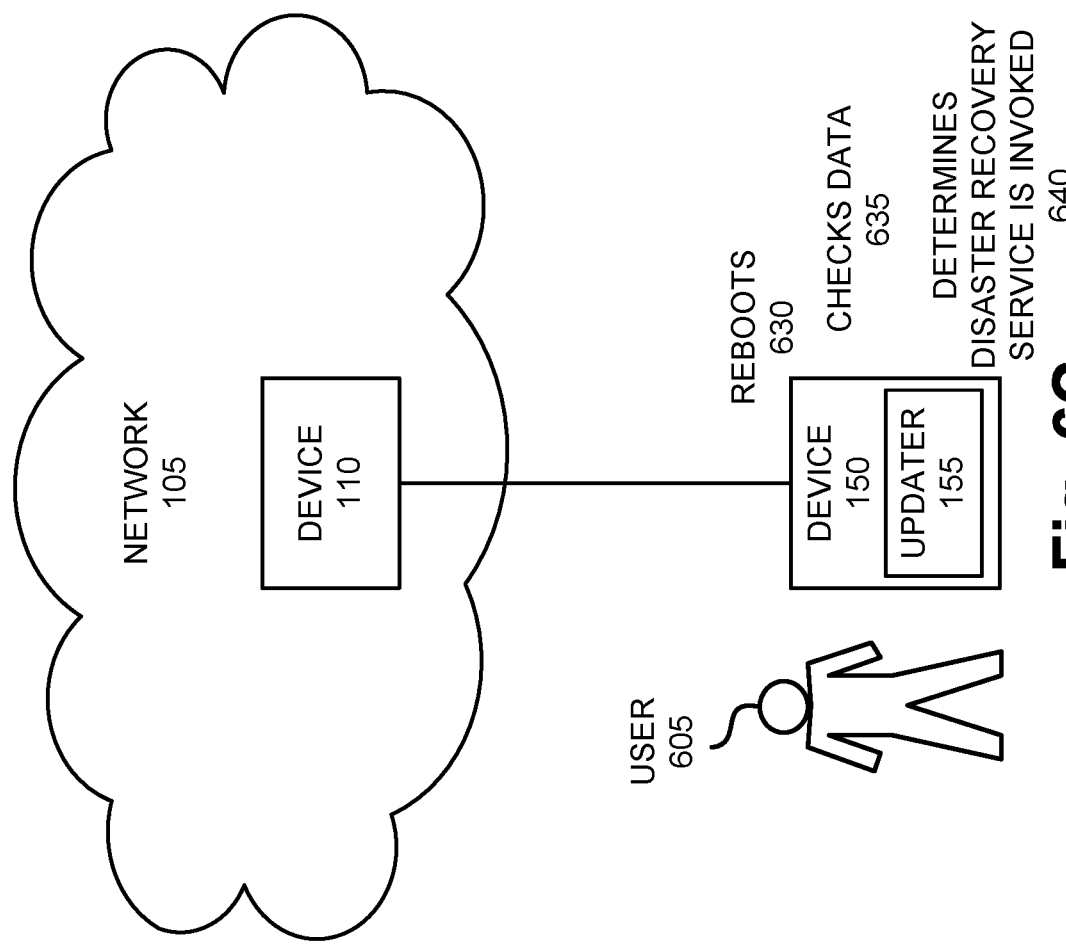

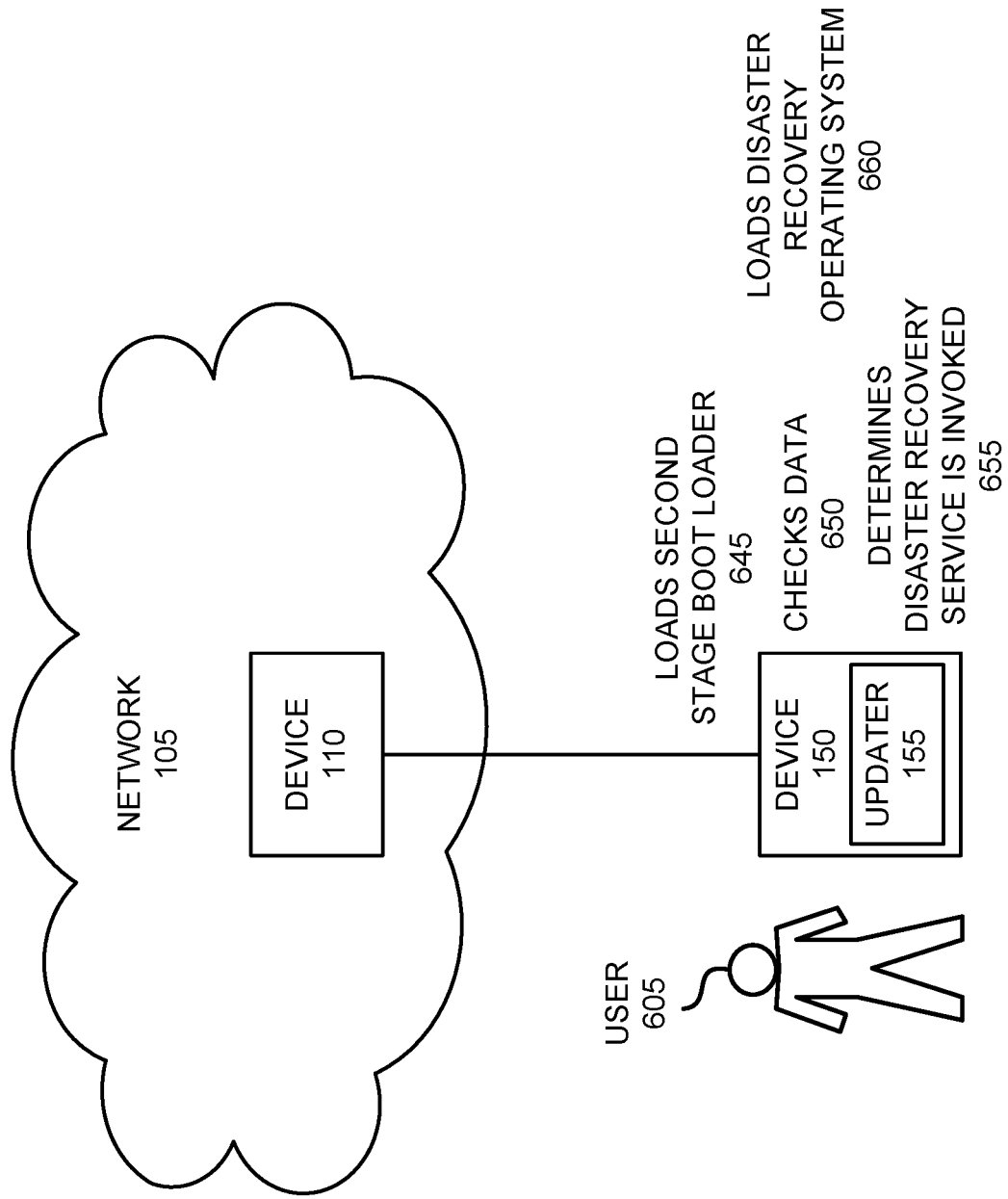

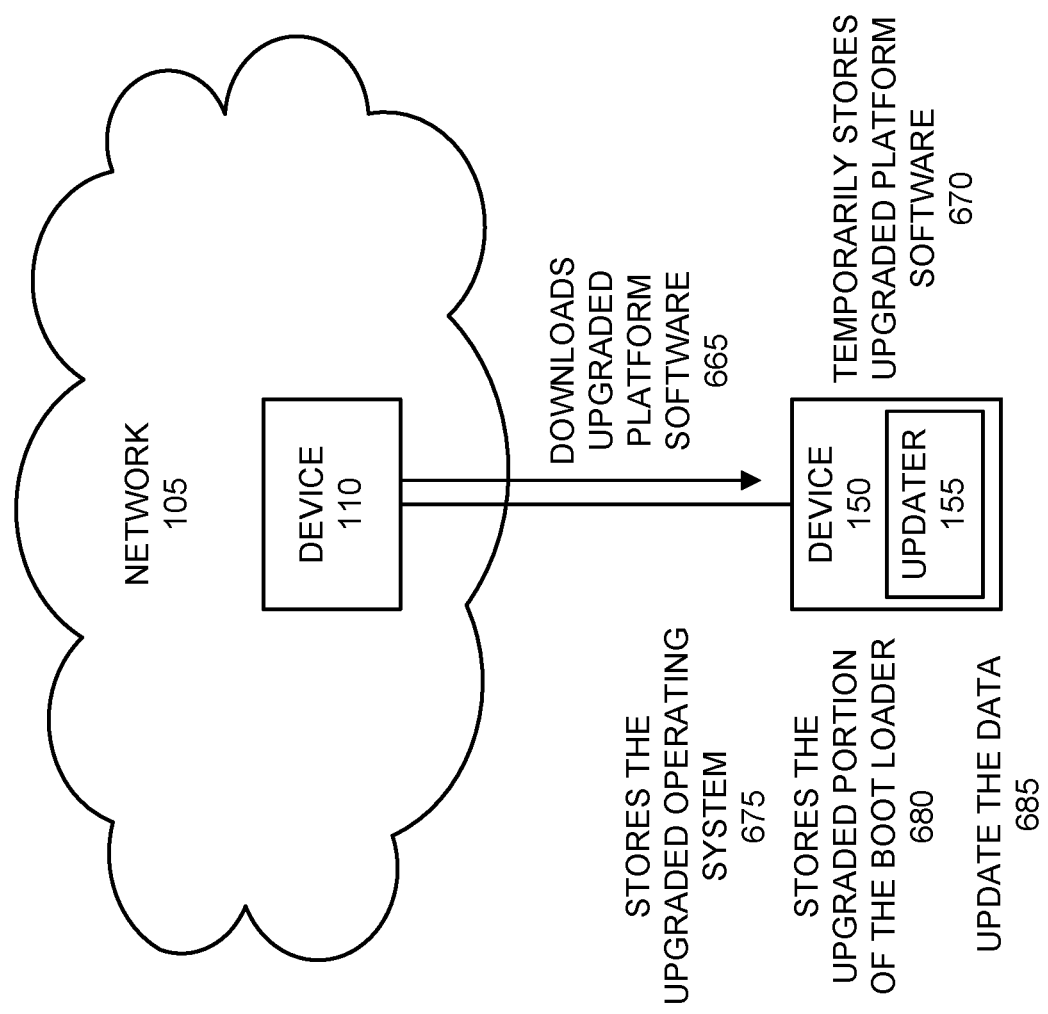

SOFTWARE UPGRADE AND DISASTER RECOVERY ON A COMPUTING DEVICE

CROSS REFERENCE TO RELATED APPLICATION

This patent application is a continuation of U.S. patent application Ser. No. 15/279,971 filed on Sep. 29, 2016, the disclosure of which is incorporated by reference herein in its entirety.

BACKGROUND

During the life of a computing device, the computing device may undergo various upgrades. The upgrade may take the form of a hardware upgrade, a software upgrade, or both. Typically, the upgrade is aimed at improving the operability and functionality of the computing device. However, during an upgrading process, the functionality of the computing device may be limited to performing the upgrade or it may be completely unavailable. Also, there is a potential that the upgrade is unsuccessful, which can result in the computing device becoming inoperable.

BRIEF DESCRIPTION OF THE DRAWINGS

FIG. 1 is a diagram illustrating an exemplary environment in which an exemplary embodiment of an update service for platform software and a disaster recovery service may be implemented;

FIGS. 3A-3E are diagrams illustrating an exemplary process of the update service according to an exemplary scenario;

FIG. 4 is a diagram illustrating exemplary components of a device that may correspond to one or more of the devices illustrated herein;

FIGS. 6A-6E are diagrams illustrating an exemplary process of the disaster recovery service according an exemplary scenario.

DETAILED DESCRIPTION OF PREFERRED EMBODIMENTS

Figure 2A:
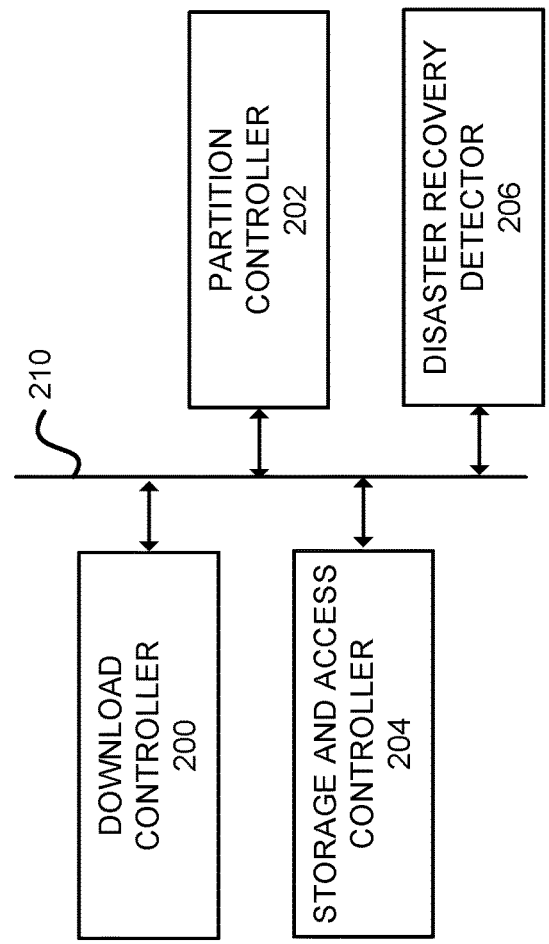
FIG. 2A is a diagram illustrating exemplary elements of an updater depicted in FIG. 1.

The following detailed description refers to the accompanying drawings. The same reference numbers in different drawings may identify the same or similar elements. Also, the following detailed description does not limit the invention.

During its lifecycle, a computing device may undergo one or multiple instances of software upgrades. For example, one type of software upgrade may involve the upgrading of an application. However, another type of software upgrade may involve the upgrading of software at the system or platform layer. For example, the software upgrade may involve upgrading a boot loader. The boot loader (also known as the "boot manager") is usually the first software that executes on the computing device after the computing device is powered up. The boot loader may perform various functions, such as initializing various hardware components and loading the operating system (OS). The boot loader may be stored in a non-volatile memory device (e.g., a flash memory) or other suitable storage device. Another example of a platform software upgrade may involve the upgrading of the operating system. The operating system may perform various functions, such as provide memory management, provide a file system interface, manage time sharing of hardware resources, and provide an environment within which an application can operate. The operating system may be stored in a non-volatile memory device (e.g., a flash memory) or other suitable storage device.

The upgrading of software at the platform layer is a delicate matter since the computing device has installed only one version of the boot loader and one version of the operating system. Consequently, if any failure or error should occur during the upgrading process, such failure or error has the potential to render the computing device inoperable. For example, the platform software could get corrupted when a power outage occurs during the upgrading process. According to another example, an operational failure may occur during the upgrading process, such as an incomplete read and/or write, which may render the computing device inoperable.

Another facet to the upgrading of software at the platform layer relates to the operational availability of the computing device. For example, during the upgrading process, the computing device will foreclose the functions normally offered to a user. As a result, the user must wait for the completion of the upgrading process before the user can use the computing device.

In addition to the complexities surrounding the upgrading of software at the platform layer, other issues can arise during the operation of the computing device. For example, the computing device may be unusable or unstable for various reasons including the presence of software bugs, invalid settings, or corrupted storage. The computer device may afford the user to invoke a factory reset to resurrect the computer device back to a functional state. The invocation of the factory reset feature may cause the computing device to erase various types of data (e.g., user settings, user data, etc.).

According to an exemplary embodiment, an update service for updating platform software on a computing device is provided. According to an exemplary embodiment, the phrase "platform software" refers to a boot loader and an operating system. According to an exemplary implementation, the operating system includes a Kernel and a root file system, each of which can be upgraded.

According to an exemplary embodiment, the boot loader is divided into multiple parts. According to an exemplary implementation, the boot loader may be divided into two parts, such as a first stage boot loader and a second stage boot loader. According to other exemplary implementations, the boot loader may be divided into more than two parts (e.g., a first stage boot loader, a second stage boot loader, a third stage boot loader, etc.).

According to an embodiment, the first stage boot loader is not upgradable. According to such an embodiment, the first stage boot loader may be allocated to perform fewer functions relative to the second stage boot loader since the first stage boot loader is not upgradeable. According to an exemplary embodiment, the first stage boot loader executes before the second stage boot loader, and the first stage boot loader includes instructions to load the second stage boot loader.

According to an exemplary embodiment, the second stage boot loader is upgradable. According to an exemplary embodiment, the update service creates duplicate copies of an upgraded second stage boot loader in a storage device. For example, when a second stage boot loader is upgraded in one region in storage, the update service duplicates the upgraded second stage boot loader to another region in the storage. In this way, if one copy of the upgraded second stage boot loader is corrupted or is unable to execute properly, another copy of the upgraded second stage boot loader is available to the first stage boot loader for loading. In the event that both copies of the upgraded second stage boot loaders are corrupted or unable to execute properly, the computing device will still have a non-upgraded copy of the second stage boot loader for use. For example, the first stage boot loader may load the non-upgraded second stage boot loader. By way of further example, the first stage boot loader and the non-upgraded second stage boot loader may be the boot loader initially installed on the computing device before any upgrades are performed by the computing device.

According to an exemplary embodiment, the update service provides multiple storage spaces within which the operating system may be stored. For example, the storage may include a first storage area that stores a first operating system (e.g., a first core Kernel and a first root file system) and a second storage area that stores a second operating system (e.g., a second core Kernel and a second root file system). According to an exemplary embodiment of an upgrading process, when the computing device boots up and runs the operating system stored in the first storage area, and subsequently receives an upgrade to the operating system, the update service writes the upgrade to the second storage area. In this way, the computing device can upgrade the operating system as a background process without interrupting or limiting the functionality provided by the currently running operating system stored in the first storage area and/or the functionality provided at the application layer. According to an exemplary embodiment, when the update service determines that a successful write of the upgraded operating system to the second storage area has occurred, the update service will make the upgraded operating system available for use. However, when the update service determines that an error occurred, the computing device may, during a subsequent boot-up, execute the operating system stored in the first storage area.

In view of the foregoing, the update service for updating platform software on a computing device may eliminate or reduce the risk of inoperability of a computing device stemming from a failure or an error that occurs during an upgrade process. Additionally, the update service may maintain the full functionality of the computing device (e.g., at the platform layer, at the application layer) during the upgrading process. For example, assume the computing device is a set top box, the set top box may continue to stream live television while the platform software is being upgraded. According to another example, assume the computing device is a mobile phone, the user may continue his/her telephone conversation with a friend while the platform software is being upgraded.

According to an exemplary embodiment, a disaster recovery service is provided. According to an exemplary embodiment, the disaster recovery service is invoked by a user continuously pressing a button for a minimum amount of time. According to an exemplary embodiment, in response to the invocation, the disaster recover service causes the computing device to execute a disaster recovery operating system (DROS). The disaster recover operating system provides the computing device with the functional ability to download and store upgraded platform software. When the upgraded platform software is successfully downloaded and stored, the computing device may reboot and operate using the upgraded platform software.

FIG. 1 is a diagram illustrating an exemplary environment 100 in which an exemplary embodiment of the update service for platform software and the disaster recovery service may be implemented. As illustrated, environment 100 includes a network 105, a device 110, and a device 150. Environment 100 includes a link 120 between device 110 and device 150.

Environment 100 may be implemented to include a wired, an optical, and/or a wireless link among the devices and the network illustrated. A communicative connection via a link may be direct or indirect. For example, an indirect communicative connection may involve an intermediary device and/or an intermediary network not illustrated in FIG. 1. The number and the arrangement of the link illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, according to other embodiments, environment 100 may not include network 105, device 110, and link 120.

Network 105 includes one or multiple networks of one or multiple types. For example, network 105 may be implemented to include a terrestrial network, a satellite network, a wireless network, and/or a wired network. By way of further example, network 105 may be implemented to include an access network (e.g., a radio access network (RAN), a WiMax network, etc.), a core network, an optical network, the Internet, a mobile network, a local area network (LAN), a service provider network, a private Internet Protocol (IP) network, and/or another type of computer network.

Device 110 includes a device that has computational and communicative capabilities. Device 110 may be implemented as a network computer or some other type of computational and communicative device. According to an exemplary embodiment, device 110 stores platform software to be upgraded at device 150. According to an exemplary embodiment, device 110 downloads the upgrading platform software to device 150. According to exemplary implementations, device 110 may download the upgrading platform software to device 150 based on some triggering event. For example, the triggering event may be a request from device 150 (e.g., on-demand, user input), an administrator configuration associated with device 110 (e.g., a schedule, a command from an administrator, etc.) or some other configurable parameter.

Device 150 includes a device that has computational and communicative capabilities. Device 150 may be implemented as an end user device, a network device, a mobile device, a stationary device, a portable device, or any other type of device that operates based on platform software. By way of further example, device 150 may be implemented as a smartphone, a personal digital assistant, a tablet, a laptop, a netbook, a phablet, a wearable device, a set top box, an infotainment system in a vehicle, a game system, a music playing device, a location-aware device, a smart television, or some other type of end user device (e.g., a kiosk, a vending machine, etc.). Additionally, by way of further example, device 150 may be implemented as a host device, a router device, a gateway device, a security device (e.g., a firewall, etc.), an application server device, or some other type of network device.

According to an exemplary embodiment, device 150 includes an updater 155. Updater 155 includes logic that provides the update service for upgrading platform software. Updater 155 may be downloaded (e.g., with the upgrading platform software or separately) and subsequently installed, or updater 155 may be pre-installed logic that is resident on device 150.

FIG. 2A is a diagram illustrating exemplary elements of an exemplary embodiment of updater 155. As illustrated, updater 155 includes a download controller 200, a partition controller 202, a storage and access controller 204, a disaster recovery detector 206, and a link 210. According to other exemplary embodiments, updater 155 may include additional, fewer, and/or different elements than those illustrated in FIG. 2A and described herein. For example, according to other exemplary embodiments, updater 155 may not include partition controller 202 when device 150 is pre-configured with a storage device that is partitioned for storing upgrades (e.g., the boot loader, the operating system), as described herein. Alternatively, for example, according to other exemplary embodiments, device 150 may be pre-configured with multiple and separate storage devices in which each storage device is configured to store an upgradeable portion of the platform software, as described herein.

Additionally, with reference to FIG. 2A, multiple elements of updater 155 may be combined into a single element and/or a single element may be implemented as multiple elements in which a process or a function may be collaboratively performed or multiple processes or functions may be split between them. According to an exemplary embodiment, download controller 200, partition controller 202, and storage and access controller 204 include logic that supports the update service, as described herein. According to an exemplary embodiment, disaster recovery detector 206 and, download controller 200, partition controller 202, and/or storage and access controller 204 include logic that supports the disaster recovery service, as described herein.

Link 210 provides a communicative link between two or more elements. Link 210 may be implemented as a hardware link (e.g., a bus, a shared memory space, etc.), a software link (e.g., inter-process communication (IPC), etc.), or a combination thereof.

Download controller 200 includes logic that manages the obtainment and storage of upgraded platform software at device 150. According to an exemplary implementation, download controller 200 includes logic that establishes a connection with device 110 and downloads the upgraded platform software from device 110. Download controller 200 includes logic that stores the downloaded platform software in a storage device of device 150. For example, download controller 200 may store the downloaded platform software in a temporary storage device (e.g., a cache, a volatile memory device, etc.) or other suitable storage device. Download controller 200 may also include logic that performs various network-related functions pertaining to the downloading and/or the storing of the upgraded platform software. For example, download controller 200 may include logic that performs error detection and correction (e.g., a cyclic redundancy check (CRC), etc.), decompression, decryption, authentication (e.g., of device 110), or another type of communication service, data service, and so forth.

According to another exemplary implementation, download controller 200 includes logic that obtains and stores the upgraded platform software based on a process other than downloading from device 110. For example, a user (not illustrated in FIG. 1) may input or load the upgraded platform software on device 150. By way of further example, the user may input or load the upgraded platform software via a disk drive, a Universal Serial Bus (USB) drive, or other type of input mechanism provided by device 150.

Partition controller 202 includes logic that partitions a storage device. According to an exemplary implementation, partition controller 202 partitions the storage device to permit storage of an upgraded portion of the boot loader within the partition. For example, the upgraded portion of the boot loader corresponds to a second stage boot loader. According to an exemplary implementation, partition controller 202 partitions the storage device to permit storage of an upgraded operating system within the partition. For example, the upgraded operating system includes an upgraded Kernel and an upgraded root file system.

According to an exemplary implementation, the storage device is a non-volatile memory device or other suitable storage device. The storage device may be a dedicated hardware component or a shared hardware component of device 150. Partition controller 202 may include logic that formats the storage area of each partition. Partition controller 202 may partition one or multiple storage devices.

Storage and access controller 204 includes logic that stores the upgraded platform software. According to an exemplary implementation, storage and access controller 204 uses the upgraded portion of the boot loader, which is temporarily stored in the storage device by download controller 200, and stores the upgraded portion of the boot loader in the storage device that is partitioned. For example, storage and access controller 204 stores an upgraded second stage boot loader in a first partition of the storage device and stores a copy of the upgraded second stage boot loader in a second partition of the storage device.

Storage and access controller 204 may include logic that performs various data services (e.g., error detection and correction, decompressing/unpacking of a file, etc.) during the storing process. Storage and access controller 204 may include logic that stores the portions of the upgraded platform software in a particular order. For example, storage and access controller 204 may store the upgraded operating system (e.g., the Kernel and then the root file system) before attempting to store the upgraded portion of the boot loader. If the storage of the upgraded operating system is unsuccessful, storage and access controller 204 may abandon the storage process. However, when the storage of the upgraded operating system is successful, storage and access controller 204 continues with the storing process and stores the upgraded portion of the boot loader. A description of a storage layout is described further below.

Figure 2B:
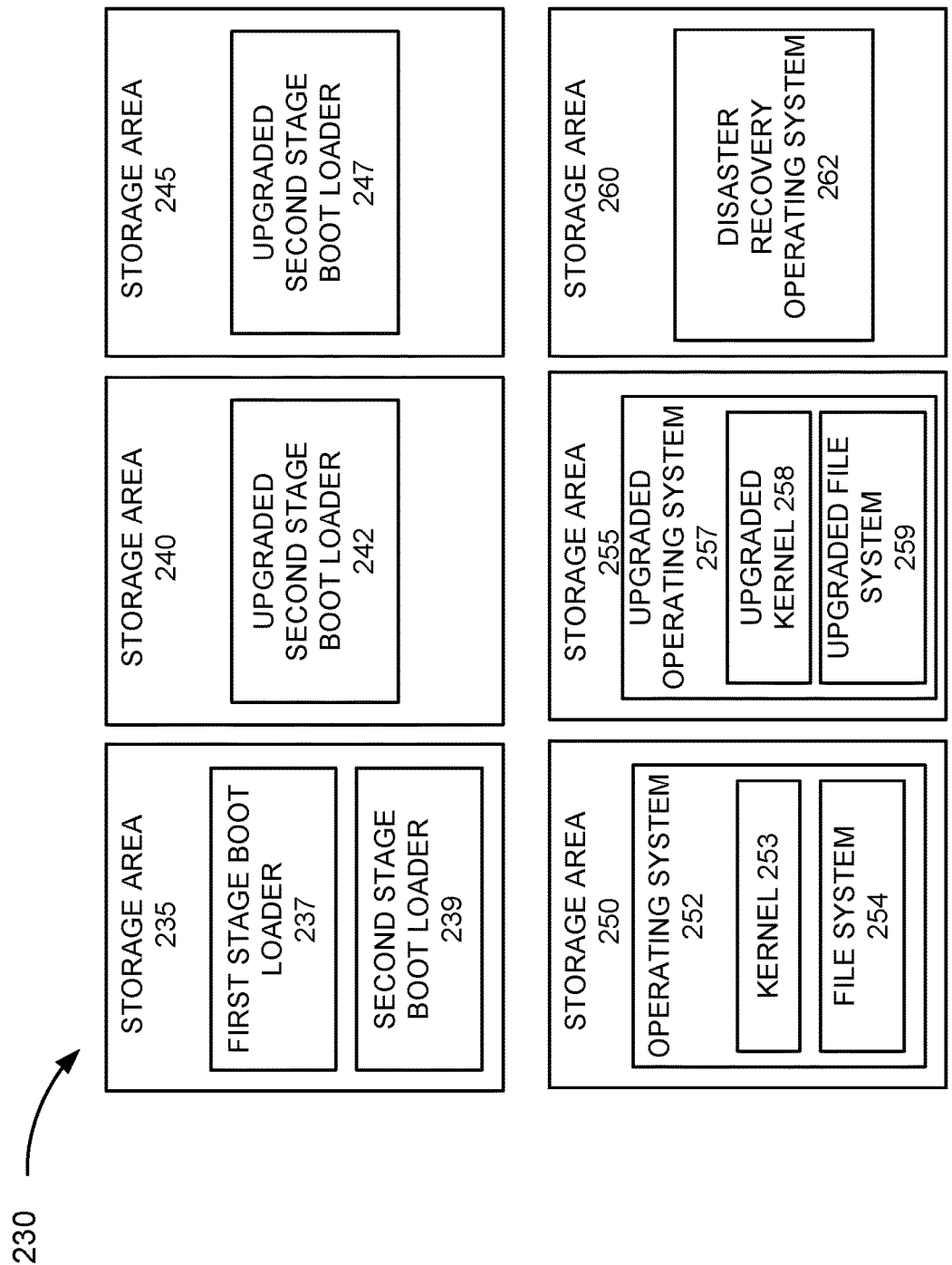
FIG. 2B is a diagram illustrating exemplary elements of a storage device.

FIG. 2B is a diagram illustrating an exemplary storage device 230 having an exemplary storage layout. As illustrated, storage device 230 may include storage areas 235, 240, 245, 250, 255, and 266. According to various exemplary implementations, storage device 230 may include one or multiple storage devices. Referring to FIG. 2B, storage device 230 includes a storage area 235. Storage area 235 stores a first stage boot loader 237 and a second stage boot loader 239. First stage boot loader 237 and second stage boot loader 239 may be implemented as the boot loader that is initially installed in device 150. According to an exemplary implementation, storage area 235 is write-protected so that first stage boot loader 237 and second stage boot loader 239 may be preserved and used as a fallback boot loader in case an error occurs during a boot-up process that attempts to use an upgraded portion of the boot loader. According to an exemplary embodiment, first stage boot loader 237 is not upgradeable. According to an exemplary embodiment, second stage boot loader 239 is upgradeable and upgrades may be stored in storage areas 240 and 245.

Storage area 240 may be configured to store an upgraded second stage boot loader 242 and storage area 245 may be configured to store an upgraded second stage boot loader 247. According to an exemplary implementation, when an upgrade to the second stage boot loader is stored in storage device 230, storage and access controller 204 may store duplicate copies of the upgraded second stage boot loaders (e.g., upgraded second stage boot loaders 242 and 247) in storage areas 240 and 245.

Storage area 250 stores an operating system 252. According to an exemplary implementation, operating system 252 includes a Kernel 253 and a root file system 254. Operating system 252 may be the operating system that is initially installed in device 150. Alternatively, operating system 252 may be an upgraded operating system. That is, storage area 250 may be configured to store an upgraded operating system. Storage area 255 may be configured to store an upgraded operating system 257. According to an exemplary implementation, upgraded operating system 257 includes an upgraded Kernel 258 and an upgraded root file system 259. In this way, storage area 250 and storage area 255 may store different versions of an operating system. For example, storage area 250 may store a version 1 of the operating system. When an upgrade takes place, storage area 255 may store a version 2 of the operating system. When a next upgrade takes place, storage area 250 may store a version 3 of the operating system. According to an exemplary embodiment, device 150 may be configured so that when an upgraded operating system has been activated, device 150 may not run a previous version of the operating system. Upgraded second stage boot loaders 242 and 247 include logic to load the most recent upgrade of the operating system, which may be stored in storage area 250 or storage area 255.

Storage area 260 stores a disaster recovery operating system 262. Disaster recovery operating system 262 may be another operating system initially installed in device 150. According to an exemplary implementation, storage area 260 is write-protected. According to an exemplary embodiment, disaster recovery operating system 262 includes logic that supports a disaster recovery process. According to an exemplary implementation, the disaster recovery process includes downloading and storing upgraded platform software.

Referring back to FIG. 2A, according to an exemplary implementation, storage and access controller 204 may include logic that stores a file pertaining to the upgraded platform software. For example, the file may be implemented as configuration file, a system file, or another type of file that may be accessible to an element (e.g., a boot loader, etc.) of the operating system. The file may include data indicating whether or not an upgrade to the platform software is available in device 150 for use. The file may also include data indicating whether or not a particular partition stores an upgraded portion of the boot loader. For example, the data may indicate whether storage 240, storage area 245, or both, store the upgraded second stage boot loader. The file may also store a date and timestamp associated with instances of data included in the file.

According to an exemplary implementation, during a boot-up process of device 150, first stage boot loader 237 uses the file as a basis for selecting the loading of the second stage boot loader. For example, based on the data included in the file, first stage boot loader 237 may load second stage boot loader 239 or upgraded second stage boot loader 242 or 247. Also, for example, based on the data included in the file, upgraded second stage boot loader 242 or 247 may or may not load upgraded operating system 257. For example, when storage and access controller 204 determines that upgraded operating system 257 is corrupted or contains unrecoverable errors, the file may indicate this information and upgraded second stage boot loader 242 or 247 may not load upgraded operating system 257.

According to another exemplary implementation, storage and access controller 204 may include logic that controls the loading of the boot loader and the operating system during a boot-up process of device 150. For example, storage and access controller 204 may instruct first stage boot loader 237 via a communication whether to load second stage boot loader 239 or upgraded second stage boot loader 242 or 247. According to an exemplary implementation, the communication may be an inter-process communication. Additionally, for example, storage and access controller 204 may instruct upgraded second stage boot loader 242 or 247 whether to load upgraded operating system 257. Storage and access controller 204 includes logic that determines the appropriate boot loader and the appropriate operating system to execute based on various criteria. For example, the criteria may include whether an upgrade to the boot loader is stored in device 150, whether an upgraded operating system is stored in device 150, as well as other criteria described herein.

Disaster recovery detector 206 includes logic that provides a disaster recovery service. For example, the disaster recovery service includes a watchdog service. The watchdog service includes logic that detects when a disaster recovery (DR) button of device 150 has been pressed. With reference to one exemplary method for invoking the disaster recovery service, a user may press the disaster recovery button and continually hold the button down while device 150 is running (e.g., post boot-up). As described herein, other methods for invoking the disaster recovery service may be implemented. In response to the detection of the invocation, disaster recovery detector 206 includes logic that generates and stores data indicating the invocation of the service. As described herein, when device 150 reboots, the boot loader uses the stored data to identify the invocation and carry out additional disaster recovery processes.

Figure 3B:
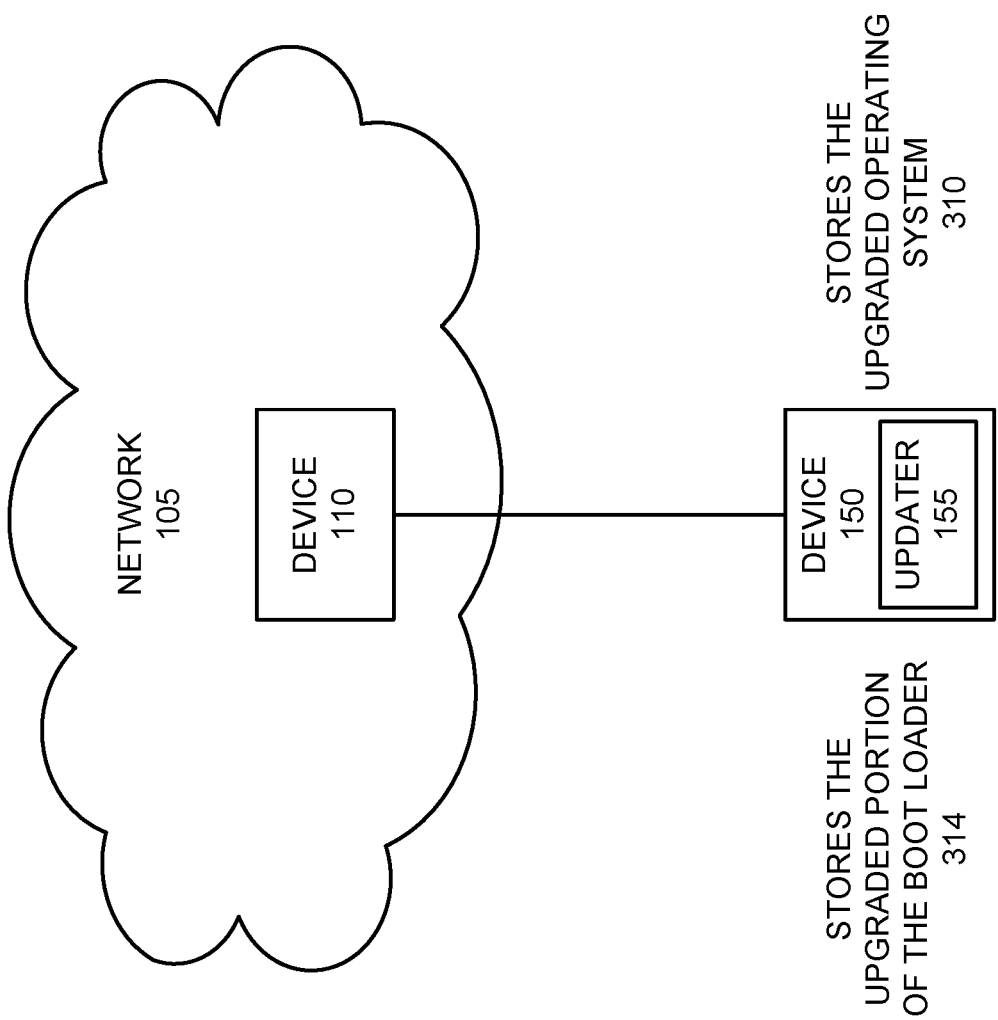

FIGS. 3A-3E are diagrams illustrating an exemplary process of the update service. Referring to FIG. 3A, according to an exemplary scenario, assume that device 150 has successfully booted up and is running normally. During the course of operation, an over-the-air (OTA) update process for the platform software is triggered. During the update process, download controller 200 of updater 155 downloads the upgraded platform software 302 from device 110. Download controller 200 temporarily stores the upgraded platform software 306 in a cache. Download controller 200 may perform various network-related services, as previously described. Downloader controller 200 may determine whether or not the upgraded platform software has been successfully downloaded based on an error checking process. According to this exemplary scenario, it may be assumed that the upgraded platform software is successfully downloaded and temporarily stored.

Referring to FIG. 3B, in response to the successful downloading and storing, storage and access controller 204 stores the upgraded platform software in a non-volatile memory device, a permanent storage device, or other type of suitable storage device. For purposes of description, it may be assumed that partition controller 202 has already formatted the storage device with the necessary partitions for storing the upgraded platform software. Storage and access controller 204 may obtain data from partition controller 202 or from a file that indicates various types of attributes, configurations, and/or information (e.g., addresses, name spaces, classes, etc.) pertaining to each partition so that the upgraded second stage boot loader and the upgraded operating system are stored in the appropriate storage device and/or the appropriate storage area within the storage device. As illustrated, updater 155 may store the upgraded operating system 310. For example, storage and access controller 204 may store an upgraded Kernel and an upgraded root file system in the storage device. Storage and access controller 204 may perform a data service to ensure that the upgraded operating system is successfully stored. According to this exemplary scenario, assume that the upgraded operating system is successfully stored. In response to such a determination, storage and access controller 204 may store the upgraded portion of the boot loader 314. For example, storage and access controller 204 may store the upgraded second stage boot loader in the storage device. Upon determining that the upgraded second stage boot loader is successfully stored, storage and access controller 204 may store another copy of the upgraded second stage boot loader in the storage device. According to this exemplary scenario, it may be assumed that the upgraded platform software is successfully stored.

Figure 3C:
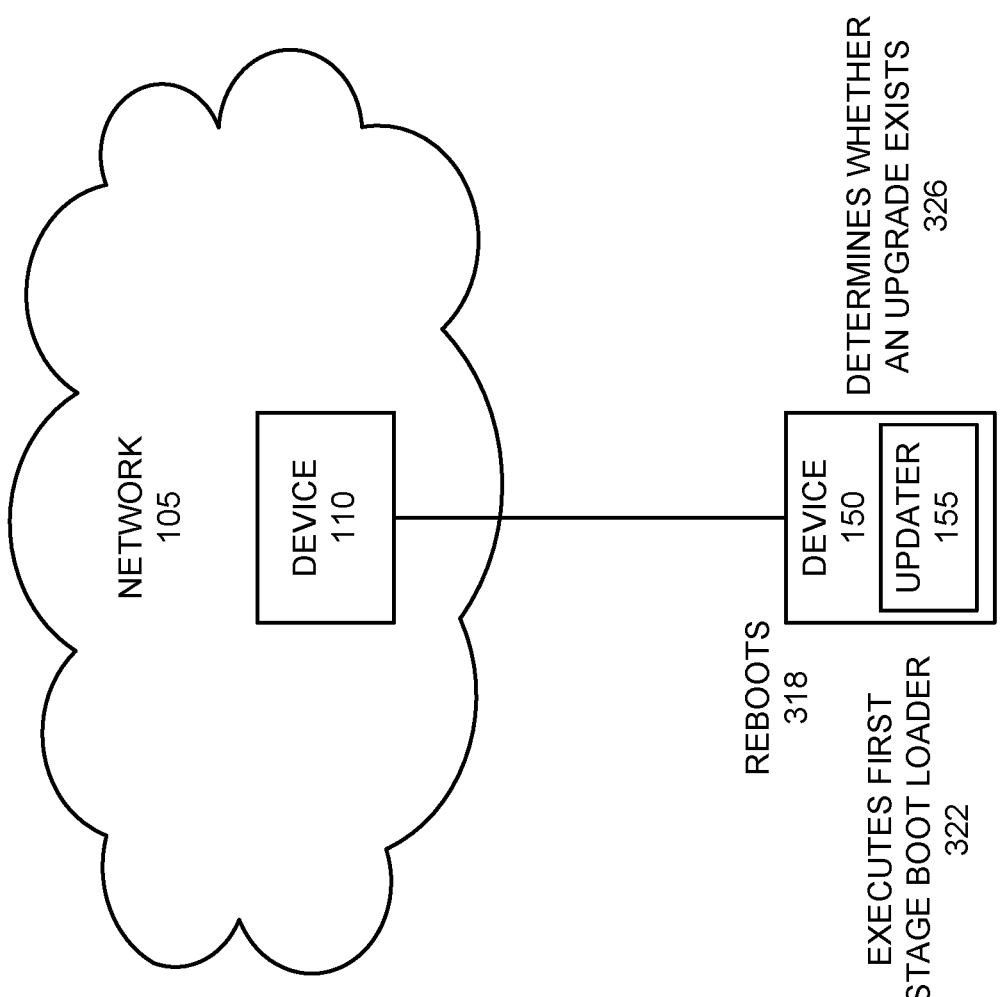

Referring to FIG. 3C, assume that device 150 is rebooted 318. For example, a user (not illustrated) of device 150 may decide to power down device 150. The user may reboot device 150 the next day. Alternatively, updater 155 may provide a user interface to the user that indicates that an update is ready for use in response to successfully storing the upgraded platform software. The user may decide to continue to run device 150 without rebooting device 150 or decide to reboot device 150. According to yet another example, when device 150 is not operated by a user, device 150 may automatically perform a reboot in response to updater 155 determining that the upgraded platform software has been successfully stored. In any event, during a boot-up process, the first stage boot loader executes its instructions 322. Also, during the boot-up process, storage and access controller 204 of updater 155 may determine whether an upgrade exists 326. For example, storage and access controller 204 determines whether an upgraded second stage boot loader is stored. For example, storage and access controller 204 may read a file that indicates whether the upgraded second stage boot loader is stored. According to this exemplary scenario, it may be assumed that an upgrade exits.

Referring to FIG. 3D, storage and access controller 204 may perform a data service directed to the upgraded second stage boot loader 330 in response to determining that the upgrade exists. For example, storage and access controller 204 may perform an error detection and correction service, a virus scan, etc., before determining whether the upgraded second stage boot loader is to be executed. According to this exemplary scenario, it may be assumed that storage and access controller 204 determines that the upgraded second stage boot loader may be executed. In response, according to an exemplary implementation, storage and access controller 204 may generate and store data in the file. The file may indicate that the first stage boot loader is to load the upgraded second stage boot loader. The file may also indicate other information, such as which copy to first access, which partition the upgraded second stage boot loader is stored, a memory address, etc. Based on the file, the first stage boot loader loads the second stage boot loader and the second stage boot loader executes 334. According to another exemplary implementation, storage and access controller 204 may communicate (e.g., an inter-process communication) with the first stage boot loader to load the upgraded second stage boot loader. The communication may include information similar to what may be included in the file (e.g., which copy to first access, etc.). Based on the communication, the first stage boot loader loads the second stage boot loader, and the second stage boot loader executes 334.

Referring to FIG. 3E, during the boot-up process, storage and access controller may perform a data service directed to the upgraded operating system 338. For example, storage and access controller 204 may perform an error detection and correction service, a virus scan, etc., before determining whether the upgraded operating system is to be executed. According to this exemplary scenario, it may be assumed that storage and access controller 204 determines that the upgraded operating system may be executed. In response, storage and access controller 204 may generate and store data in the file or communicate with the second stage boot loader to load the upgraded operating system. Based on the file or the communication, the second stage boot loader loads the upgraded operating system and the upgraded operating system executes 342.

Although FIGS. 3A-3E illustrate an exemplary embodiment of a process of the update service, according to other exemplary scenarios, the update service may perform additional operations, fewer operations, and/or different operations than those illustrated and described. For example, during the boot-up process, storage and access controller 204 may not perform a data service in relation to the second stage boot loader and/or the operating system.

FIG. 4 is a diagram illustrating exemplary components of a device 400 that may correspond to one or more of the devices described herein. For example, device 400 may correspond to components of device 110 and device 150. Additionally, exemplary elements of devices may be implemented based on the components described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.) and may include one or multiple memories (e.g., cache, etc.). Processor 410 may include a dedicated element (e.g., a dedicated microprocessor) and/or a non-dedicated element (e.g., a non-dedicated/shared microprocessor, etc.).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may also include firmware, middleware, microcode, hardware description language (HDL), and/or other form of instructions. As an example, with reference to device 150, software 420 may include an application that, when executed by processor 410, provides the update service, as described herein. According to another example, with reference to device 150, software 420 may include the upgraded platform software (e.g., boot loader, operating system), the non-upgraded boot loader and operating system, and the disaster recovery operating system.

Communication interface 425 permits device 400 to communicate with other devices, networks, systems, and/or the like. Communication interface 425 includes one or multiple wireless interfaces. Communication interface 425 may include one or multiple wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button (e.g., a power button, a disaster recovery button, a virtual button, etc.), a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

FIGS. 5A-5E are flow diagrams illustrating an exemplary process 500 of the update service. Process 500 is directed to a process previously described above with respect to FIGS. 3A-3E, as well as elsewhere in this description. According to an exemplary embodiment, device 150 performs steps of process 500. For example, processor 410 executes software 420 to perform the steps illustrated in FIGS. 5A-5E and described herein. According to this example, it may be assumed that device 150 is configured with one or multiple storage devices and/or storage spaces for storing the upgraded platform software.

Figure 5A:
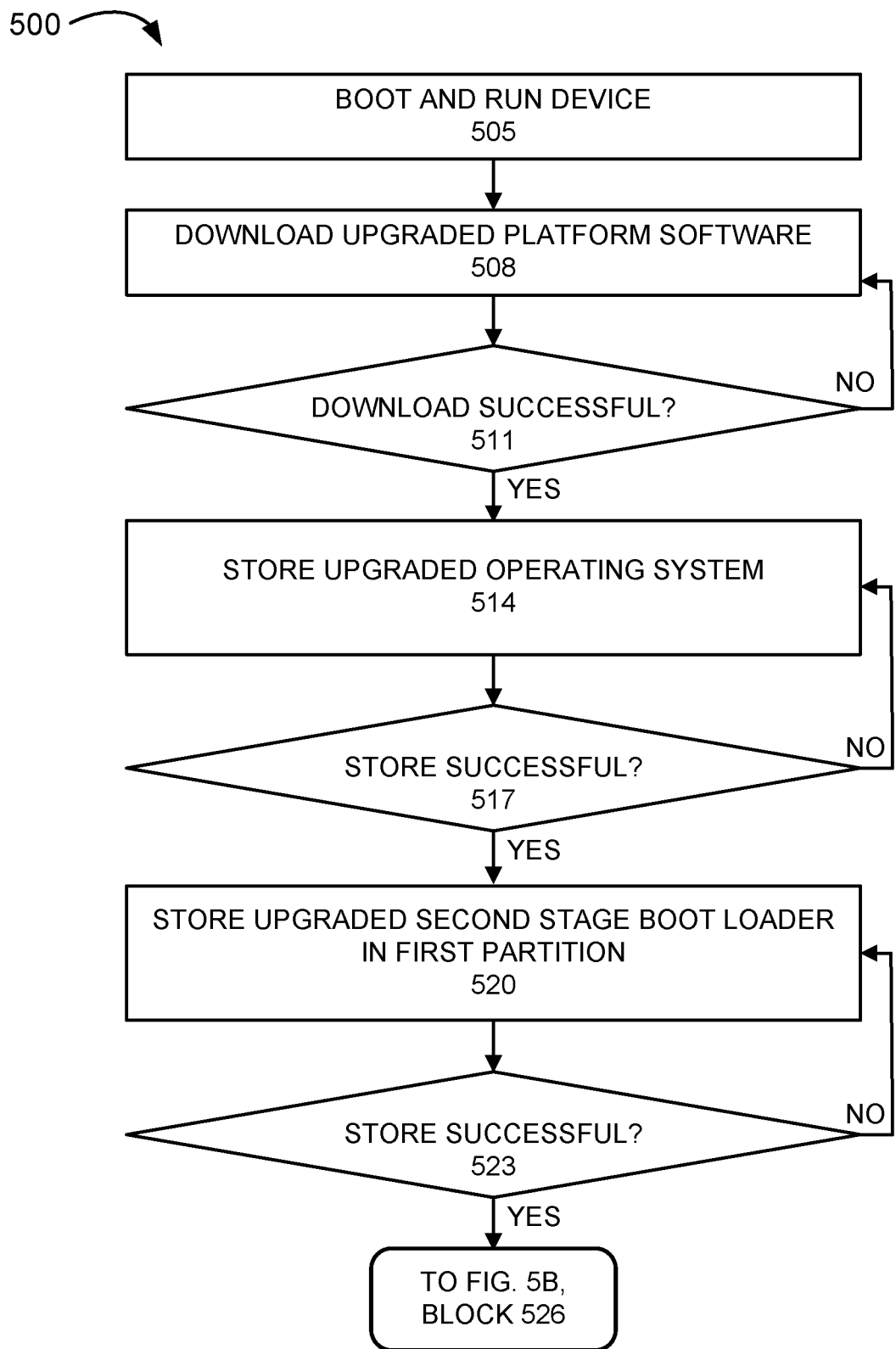
FIGS. 5A-5E are flow diagrams illustrating an exemplary process of the update service.
Figure 5B:
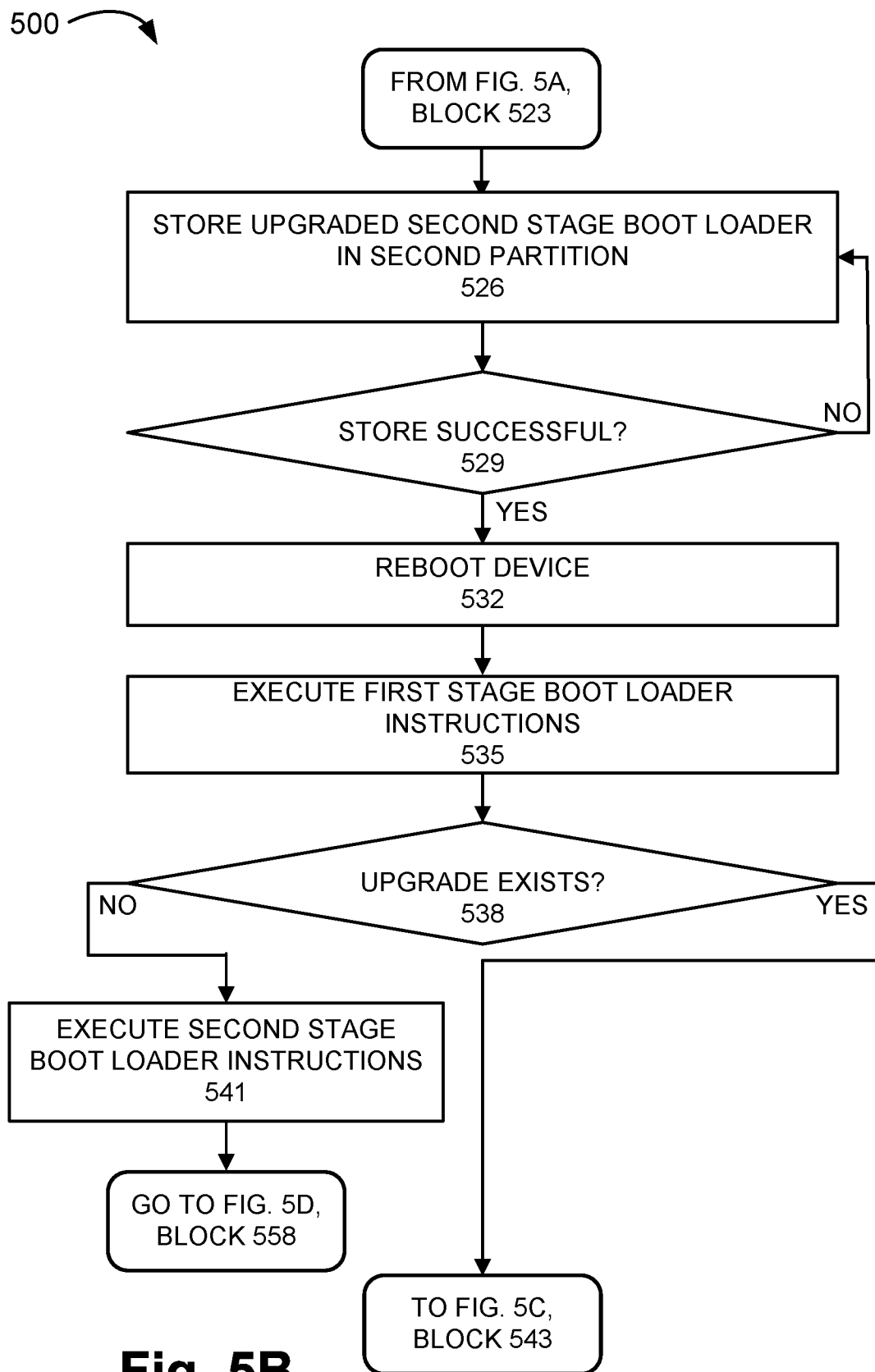

Referring to FIG. 5A, block 505, process 500 may begin with the device running. For example, device 150 may be turned on and running subsequent to a boot-up. Device 150 may be in one of various states (e.g., an active state, a sleep state, an idle state, etc.).

In block 508, upgraded platform software is downloaded. For example, download controller 200 of updater 155 may download the upgraded platform software from another device (e.g., device 110). Download controller 200 may identify various triggering events (e.g., a schedule, receiving a communication indicating an update is available, a user input, etc.) to initiate or participate in a downloading session.

In block 511, it is determined whether the download is successful. For example, as previously described, download controller 200 may perform various network-related functions pertaining to the downloading and/or storage of the upgraded platform software. When it is determined that the download is not successful (block 511—NO), process 500 may continue to block 508. For example, download controller 200 may retry the download. Download controller 200 may use well-known communication techniques (e.g., waiting a back-off period, etc.) before attempting another download. Alternatively, download controller 200 may abort the downloading process and process 500 may end.

When it is determined that the download is successful (block 511—YES), the upgraded operating system is stored (block 514). For example, in response to determining that the download is successful, storage and access controller 204 of updater 155 may store the upgraded platform software. According to an exemplary implementation, storage and access controller 204 may store portions of the upgraded platform software in a particular order. For example, storage and access controller 204 may store the upgraded operating system (e.g., Kernel, root file system) before storing the upgraded second stage boot loader. According to other exemplary implementations, the upgraded boot loader may be stored before the upgraded operating system. According to yet other exemplary implementations, the storage of the upgraded operating system and the upgraded boot loader may be performed concurrently. As previously described, storage and access controller 204 may perform various data services. According to this exemplary process, it may be assumed that the upgraded operating system is stored before the boot loader. Storage and access controller 204 selects the appropriate storage device and storage space for storing the upgraded platform software based on a system file, a configuration file, or other data stored by device 150.

In block 517, it is determined whether the upgraded operating system is successfully stored. For example, storage and access controller 204 may determine whether the upgraded operating system is successfully stored based on a data error checking service (e.g., CRC) and/or other error detection services (e.g., a write error service, etc). When it is determined that the operating system is not successfully stored (block 517—NO), process 500 may continue to block 514. For example, storage and access controller 204 may retry storing the upgraded operating system. Storage and access controller 204 may limit the number of retries. Alternatively, process 500 may end.

When it is determined that the operating system is successfully stored (block 517—YES), the upgraded second stage boot loader is stored in a first partition (block 520). For example, storage and access controller 204 may store the upgraded second stage boot loader in the first partition. In block 523, it is determined whether the upgraded second stage boot loader is successfully stored.

When it is determined that the upgraded second stage boot loader is not successfully stored (block 523—NO), process 500 may continue to block 520. For example, storage and access controller 204 may determine whether the upgraded second stage boot loader is successful stored based on a data error checking service (e.g., a CRC service) and/or other error detection services (e.g., a write error service, etc.). When it is determined that the upgraded second stage boot loader is successfully stored (block 523—YES), the upgraded second stage boot loader is stored in a second partition (block 526 of FIG. 5B). For example, storage and access controller 204 may store the upgraded second stage boot loader in the second partition.

In block 529, it is determined whether the upgraded second stage boot loader is successfully stored. For example, storage and access controller 204 may determine whether the upgraded second stage boot loader is successfully stored based on a data error checking service (e.g., a CRC service) and/or other error detection services (e.g., a write error service, etc).

When it is determined that the upgraded second stage boot loader is not successfully stored (block 529—NO), process 500 may continue to block 526. For example, storage and access controller 204 may retry storing the upgraded second stage boot loader. Storage and access controller 204 may limit the number of retries. Alternatively, process 500 may end.

When it is determined that the upgraded second stage boot loader is successfully stored (block 529—YES), the device may be rebooted (block 532). According to an exemplary implementation, in response to successfully storing the upgraded platform software, storage and access controller 204 may store a file pertaining to the storing process of the upgraded platform software. For example, the file may include data indicating whether or not an upgrade to the platform software is stored in device 150, whether or not a particular partition stores an upgraded portion of the boot loader, a date and a timestamp, and/or other types of data (e.g., an error log that indicates a first partition or a second partition does not store an upgradeable portion of the platform software (e.g., second stage boot loader), memory addresses, etc.). Additionally, with reference to block 532, subsequent to the successful storage of the upgraded platform software, device 150 may be rebooted. As previously described, for example, the rebooting of device 150 may be user-initiated or device-initiated. In block 535, the first stage boot loader instructions are executed. For example, referring to FIG. 2B, first stage boot loader 237 may execute its instructions.

In block 538, it is determined whether an upgrade exists. For example, according to an exemplary implementation, first stage boot loader 237 may read the file and determine whether the upgrade is available for use based on the reading of the file. According to another exemplary implementation, storage and access controller 204 may determine whether an upgrade to the platform software is available for use based on the reading of the file. Storage and access controller 204 may instruct first stage boot loader 237 as to whether the upgrade exists.

When it is determined that an upgrade does not exist (block 538—NO), the second stage boot loader instructions are executed (block 541). For example, first stage boot loader 237 may load the non-upgraded second stage boot loader (e.g., second stage boot loader 239). Thereafter, process 500 continues to FIG. 5D, block 558.

Figure 5C:
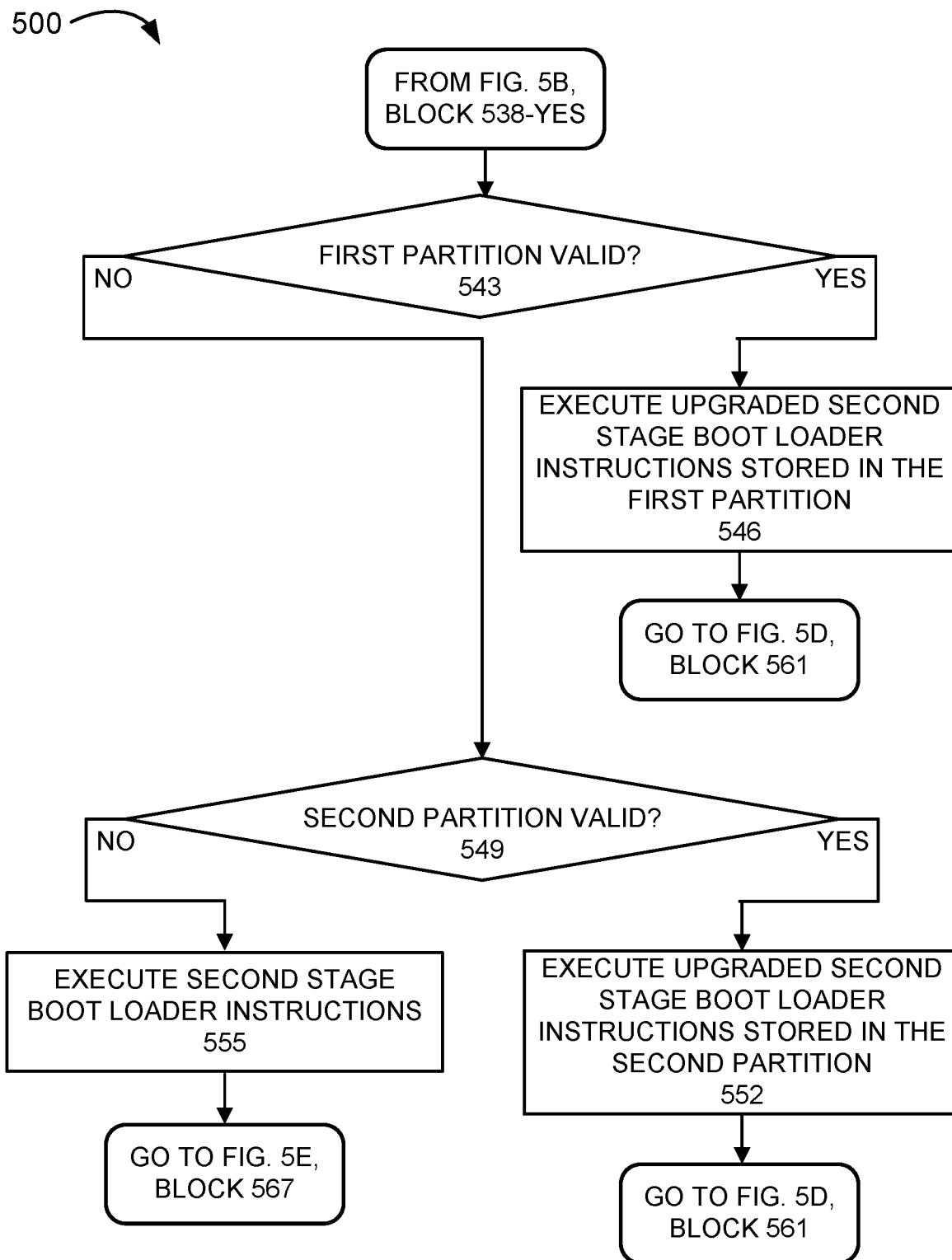

When it is determined that an upgrade does exist (block 538—YES), it is determined whether a first partition is valid (FIG. 5C, block 543). For example, storage and access controller 204 may determine that upgraded second stage boot loader 242 is stored in storage area 240 based on the file. In response, storage and access controller 204 may perform a data error checking service (e.g., a CRC service) to ensure that upgraded second stage boot loader 242 is not corrupted. According to an exemplary implementation, storage and access controller 204 may determine whether to perform the data error checking service when the elapsed time from the reboot relative to the date and timestamp of the log is greater than a threshold time period. According to other exemplary implementations, storage and access controller 204 may always perform the data error checking service.

When it is determined that the first partition is valid (block 543—YES), the upgraded second stage boot loader instructions stored in the first partition are executed (block 546). For example, storage and access controller 204 communicates to first stage boot loader 237 to load the upgraded second stage boot loader 242 stored in storage area 240. Alternatively, for example, storage and access controller 204 stores this information in the file. First stage boot loader 237 loads the upgraded second stage boot loader based on reading the file. Thereafter, process 500 continues to FIG. 5D, block 561.

When it is determined that the first partition is not valid (block 543—NO), it is determined whether the second partition is valid (block 549). For example, storage and access controller 204 may determine that upgraded second stage boot loader 242 is stored in storage area 245 based on the file. In response, storage and access controller 204 may perform a data error checking service (e.g., a CRC service) to ensure that the upgraded second stage boot loader 247 is not corrupted. According to an exemplary implementation, storage and access controller 204 may determine whether to perform the data error checking service when the elapsed time from the reboot relative to the date and timestamp of the log is greater than a threshold time period. According to other exemplary implementations, storage and access controller 204 may always perform the data error checking service.

When it is determined that the second partition is valid (block 549—YES), the upgraded second stage boot loader instructions stored in the second partition are executed (block 552). For example, storage and access controller 204 communicates to first stage boot loader 237 to load the upgraded second stage boot loader 247 stored in storage area 245. Alternatively, for example, storage and access controller 204 stores this information in the file. First stage boot loader 237 loads the upgraded second stage boot loader based on reading the file. Thereafter, process 500 continues to FIG. 5D, block 561.

When it is determined that the second partition is not valid (block 549—NO), the second stage boot loader instructions are executed (block 555). For example, storage and access controller 204 communicates to first stage boot loader 237 to load second stage boot loader 239 stored in storage area 235. Alternatively, for example, storage and access controller 204 stores this information in the file. First stage boot loader 237 loads the second stage boot loader 239 based on reading the file. Second stage boot loader 239 executes. Thereafter, process 500 continues to FIG. 5E, block 567.

Figure 5D:
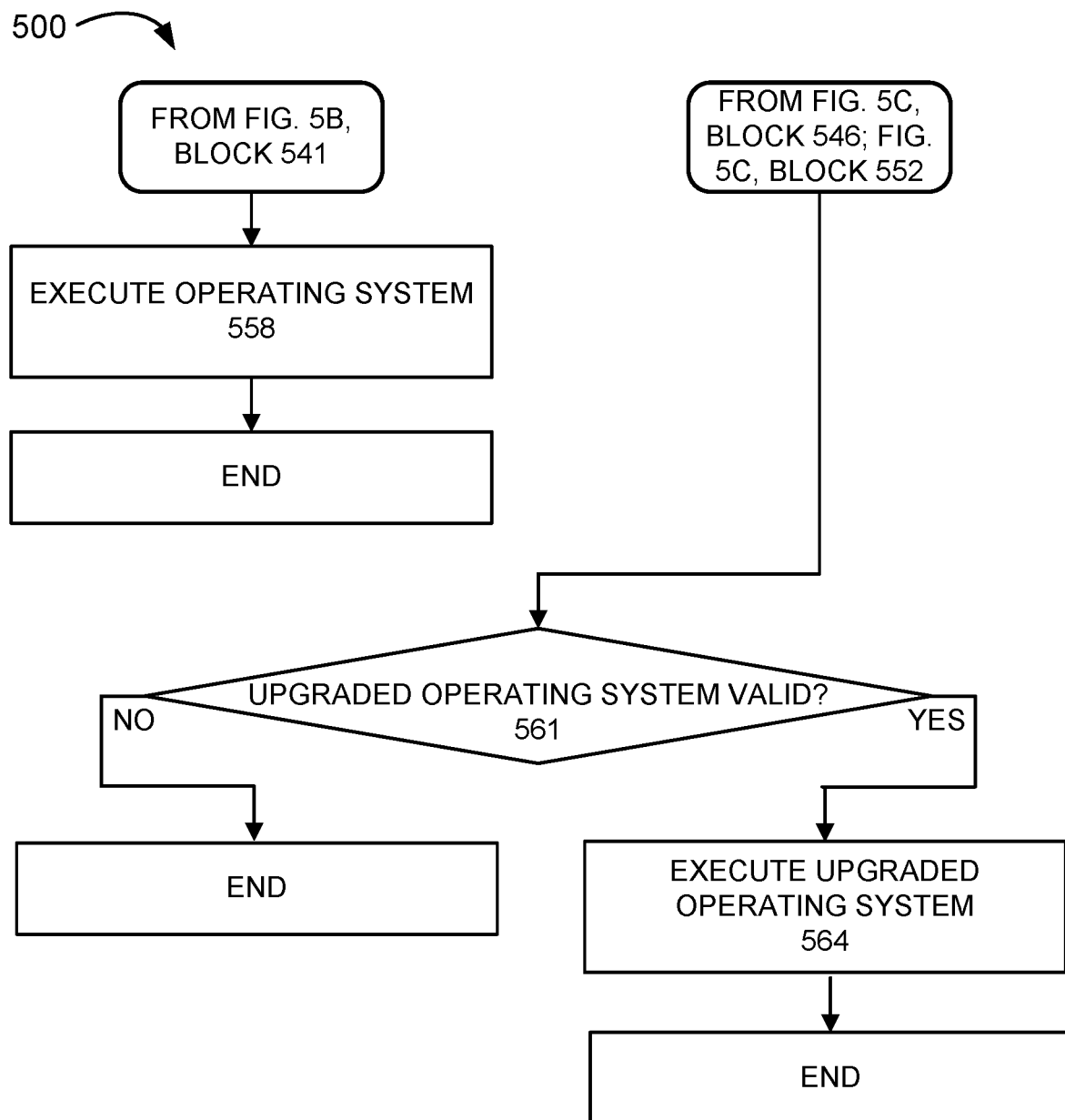

Referring to FIG. 5D, in block 558, the operating system is executed. For example, when second stage boot loader 239 is to be loaded and executed, the boot-up process will use the non-updated operating system. As illustrated, this is the case at FIG. 5B, block 541 of process 500. Also referring to FIG. 2B, second stage boot loader 239 may load operating system 252 stored in storage area 250. For example, operating system 252 may be a non-upgraded operating system of device 150. Operating system 252 may execute and process 500 may end.

In block 561 of FIG. 5D, it is determined whether the upgraded operating system is valid. For example, when the upgraded second stage boot loader is to be loaded and executed, the boot-up process will use the updated operating system. As illustrated, this is the case at FIG. 5C, block 546 and FIG. 5C, block 552 of process 500. In response to this condition, for example, storage and access controller 204 may perform a data error checking service (e.g., a CRC service) to ensure that the upgraded operating system 257 stored in storage area 255 is not corrupted. According to an exemplary implementation, storage and access controller 204 may determine whether to perform the data error checking service when the elapsed time from the reboot relative to the date and timestamp of the log is greater than a threshold time period. According to other exemplary implementations, storage and access controller 204 may always perform the data error checking service.

When it is determined that the upgraded operating system is valid (block 561—YES), the upgraded operating system is executed (block 564). For example, the upgraded second stage boot loader (e.g., upgraded second stage boot loader 242 or upgraded second stage boot loader 247) may load the upgraded operating system. Storage and access controller 204 may communicate to the upgraded second stage boot loader to load the upgraded operating system stored in storage area 255. The communication may include the path or memory address pertaining to the upgraded operating system. Alternatively, the upgraded second stage boot loader may read the file, which is generated and stored by storage and access controller 204, and load the upgraded operating system based on the reading. For example, the file may indicate that the upgraded operating system is available for use, a path or memory address, and/or other data that permits the upgraded second stage boot loader to load the upgraded operating system. Thereafter, the upgraded operating system executes and process 500 may end.

When it is determined that the upgraded operating system is not valid (block 561—NO), process 500 ends. For example, according to an exemplary implementation, the upgraded boot loader may not load the default/initial operating system (e.g., operating system 252 stored in storage area 250). Thus, process 500 may end and the boot-up process may fail.

Figure 5E:
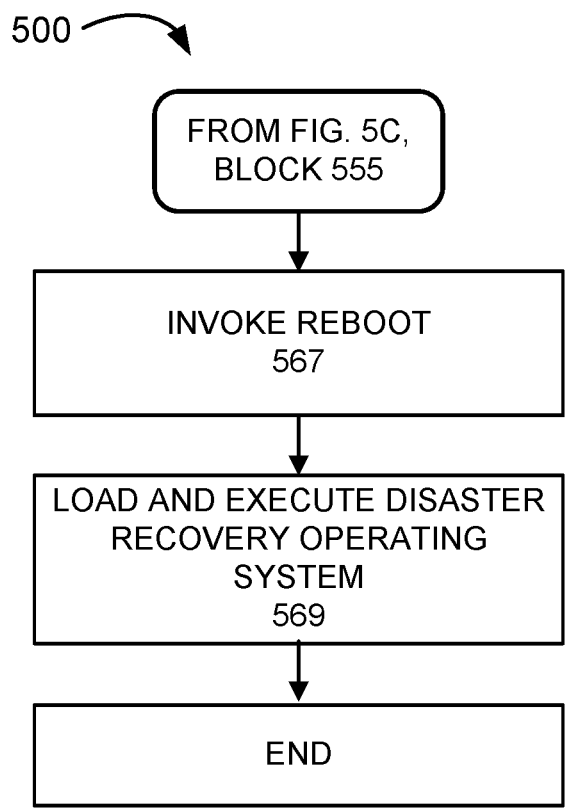

Referring to FIG. 5E, in block 567, a reboot may be invoked. For example, second stage boot loader 239 includes logic to invoke a reboot since both of the upgraded second stage boot loaders 242 and 247 failed. During the reboot of device 150, in block 569, the disaster recovery operating system is loaded and executed. For example, as described herein, first stage boot loader 237 and second stage boot loader 239 may execute, followed by the loading and executing of disaster recovery operating system 262.

Although FIGS. 5A-5E illustrate an exemplary process 500 of the update service, according to other embodiments, process 500 may include additional operations, fewer operations, and/or different operations than those illustrated in FIGS. 5A-5E and described herein.

As previously described, a user may invoke the disaster recovery service when the computing device is not operating correctly. For example, the user may invoke the disaster recovery service by pressing a button (e.g., a disaster recovery button). Unlike other reset procedures, the disaster recovery service includes downloading and storing an operating system. FIGS. 6A-6E are diagrams illustrating an exemplary disaster recovery process.

Referring to FIG. 6A, according to an exemplary scenario, assume that device 150 is running. During the course of operation, device 150 exhibits behavior that causes a user 605 to invoke the disaster recovery service. User 605 presses a disaster recovery button 610 for a certain time period. Disaster recovery detector 206 of updater 155 is monitoring the state of the disaster recovery button during this time. For example, disaster recovery detector 206 may monitor the voltage value (e.g., high or low) of a pin (e.g., a general purpose input output (GPIO), etc.) associated with the disaster recovery button. In view of the user's action, disaster recovery detector 206 detects the pressing 615 of the disaster recovery button. Based on the length of time of the pressing, disaster recovery detector 206 determines that the disaster recovery service is being invoked 620. Referring to FIG. 6B, in response to such a determination, before device 150 is powered down and/or reboots, disaster recovery detector 206 generates and stores data 625 indicating that the disaster recovery service is invoked. The data may be implemented as a system file, a configuration file, or other type file. The data may include a date and timestamp and/or similar types of data. In this way, during the next reboot, the boot loader of device 150 is able to determine that the disaster recovery service was invoked during the previous operating cycle of device 150.

Referring to FIG. 6C, subsequently, device 150 is powered on and reboots 630. According to various exemplary implementations, the pressing of the disaster recovery button may also include a powering down of device 150, or a powering down and a subsequent powering up of device 150. Alternatively, user 605 may need to power down device 150 and/or power back up device 150. According to either scenario, during the boot-up process, first stage boot loader 237 includes logic that checks whether data 635 (e.g., a configuration file, etc.) indicates that the disaster recovery service was invoked during the previous operating cycle. According to this scenario, first stage boot loader 237 determines that the disaster recovery service is invoked 640.

Referring to FIG. 6D, in response to such a determination, first stage boot loader 237 loads the non-upgraded second stage boot loader (e.g., second stage boot loader 239). During execution of the second stage boot loader, second stage boot loader 239 includes logic that checks whether data 650 (e.g., a configuration file, etc.) indicates that the disaster recovery service was invoked, and determines that the disaster recovery service is invoked 655. In response to such a determination, second stage boot loader 239 loads the disaster recovery operating system 660 (e.g., disaster recovery operating system 262 of FIG. 2B).

Referring to FIG. 6E, the disaster recovery process further includes downloading and storing an upgraded platform software. In a manner similar to that previously described in relation to FIGS. 3A and 3B, device 150 may download an upgraded platform software 665, temporarily store the upgraded platform software 670, store the upgraded operating system 675 (e.g., in storage area 255), and store the upgraded portion of the boot loader 680 (e.g., in storage areas 240 and 245). The upgraded platform software may be of a "gold" standard (e.g., well-tested, etc.). Additionally, as illustrated in FIG. 6E, device 150 may update the data 685 (e.g., the file) when the storing of the upgraded platform software is successful. The updated data may indicate to use the upgraded platform software for the next boot-up (absent another invocation of the disaster recovery service). According to various exemplary embodiments, the process of downloading and storing the upgraded platform software may be performed by updater 155, disaster recovery operating system 262, or a combination of both.

Although FIGS. 6A-6E illustrate an exemplary embodiment of a process of the disaster recovery service, according to other exemplary scenarios, the disaster recovery service may perform additional operations, fewer operations, and/or different operations than those illustrated and described. For example, according to other exemplary implementations, the disaster recovery service may be invoked in a different manner than described in relation to this scenario. By way of example, the user may invoke the disaster recovery service during boot-up of device 150. For example, the user may press a power button and also the disaster recovery button for a minimum amount of time. As described herein, the first stage boot loader may detect the pressing of the disaster recovery button, which may cause the subsequent loading of the non-upgradeable second stage boot loader and the disaster recovery operating system.

Figure 7A:
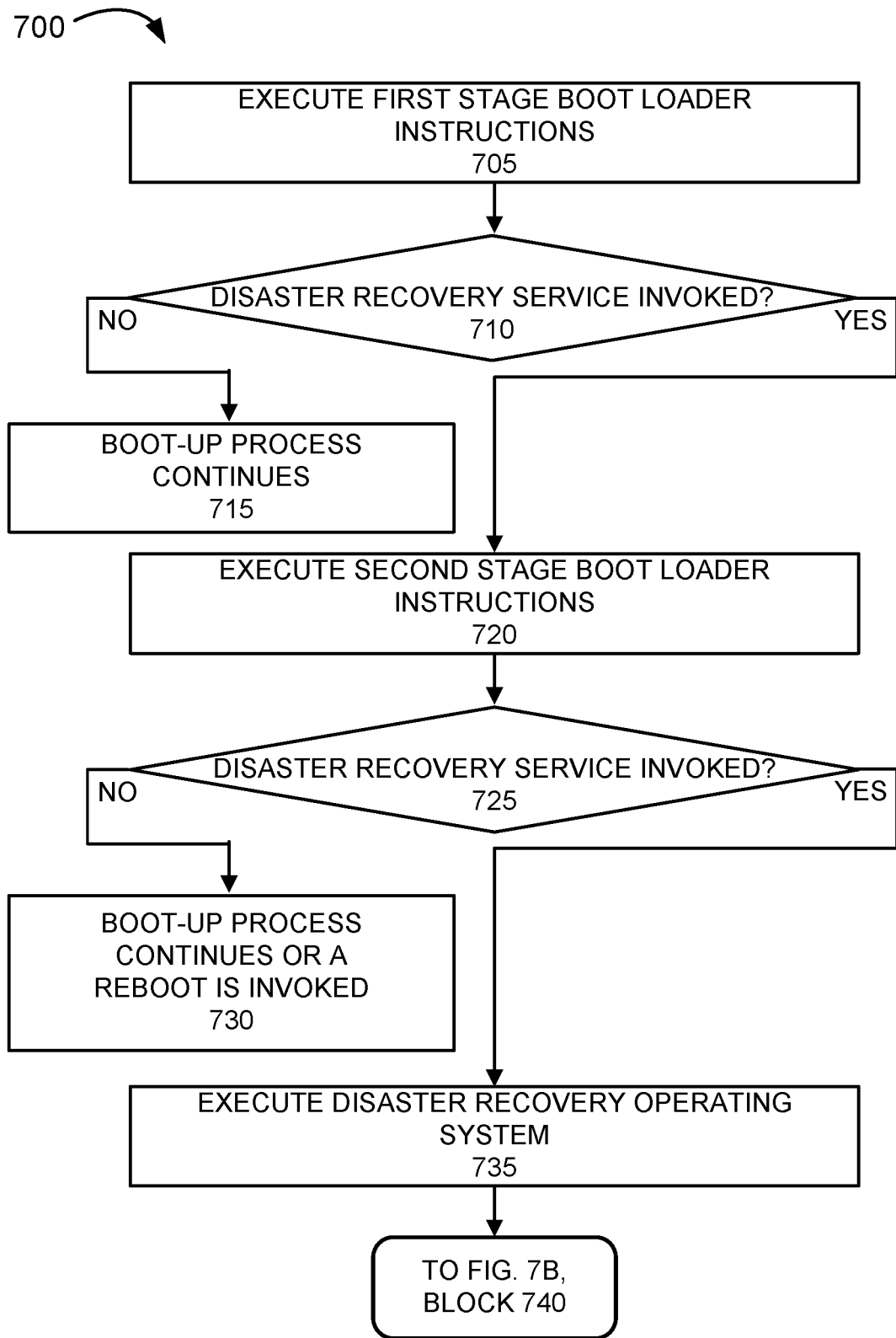
FIGS. 7A and 7B are flow diagrams illustrating an exemplary process of the disaster recovery service.
Figure 7B:
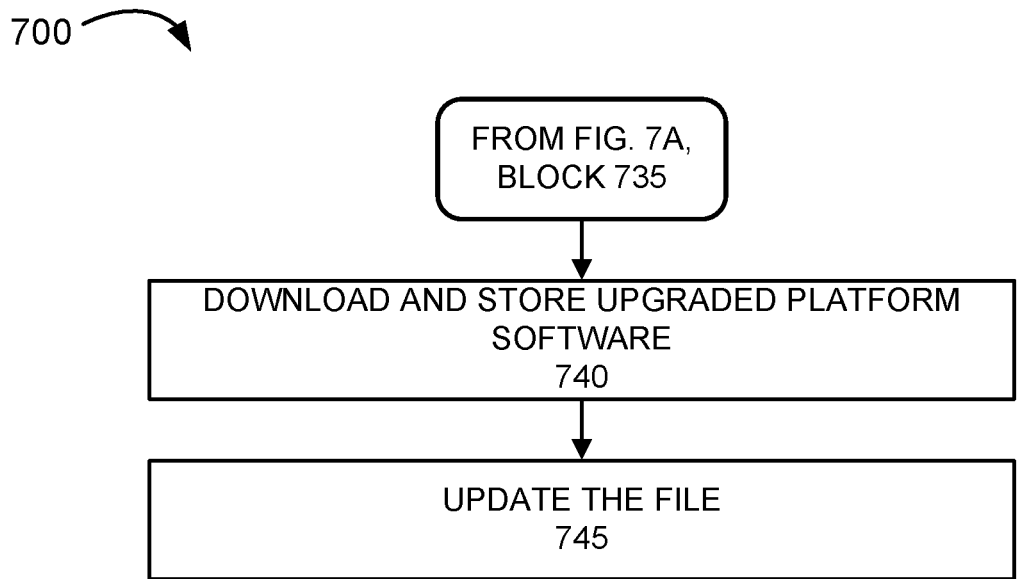

FIGS. 7A and 7B are flow diagrams illustrating an exemplary process 700 pertaining to the disaster recovery service. Process 700 is directed to a process previously described above with respect to FIGS. 6A-6E, as well as elsewhere in this description. According to an exemplary embodiment, updater 155, operating system 252, and disaster recovery operating system 262 perform process 700. According to another exemplary embodiment, operating system 252 and disaster recovery operating system 262 perform process 700. For example, processor 410 executes software 420 to perform the steps illustrated in FIGS. 7A and 7B and described herein.

Referring to FIG. 7A, block 705, the first stage boot loader instructions are executed. For example, first stage boot loader 237 is executed during a boot-up process.

In block 710, it is determined whether the disaster recovery service is invoked. For example, during the boot-up process, first stage boot loader 237 includes logic to detect whether the disaster recovery button is being pressed during the boot-up. For example, first stage boot loader 237 includes logic that detects the voltage level (e.g., high or low) of a pin associated with the disaster recovery button. By way of further example, when first stage boot loader 237 detects that the voltage level is high, first stage boot loader 237 determines that the disaster recovery service is being invoked, and when the voltage level is low, first stage boot loader 237 determines that the disaster recovery service is not being invoked. Additionally, or alternatively, during the boot-up process, first stage boot loader 237 includes logic to read the file (e.g., a configuration file, etc.) that indicates whether the disaster recovery service was invoked during the previous operating cycle of device 150.

When it is determined that the disaster recovery service is not invoked (block 710—NO), the boot-up process may continue (block 715). For example, with reference to FIG. 5B, the boot-up process may continue at block 538 in which a determination is made whether or not an upgrade exists.

When it is determined that the disaster recovery service is invoked (block 710—YES), the second stage boot loader instructions are executed (block 720). For example, first stage boot loader 237 loads second stage boot loader 239 and second stage boot loader 239 begins to execute.

In block 725, it is determined whether the disaster recovery service is invoked. For example, during the boot-up process, second stage boot loader 239 includes logic to detect whether the disaster recovery button is still being pressed during the boot-up. Additionally, or alternatively, during the boot-up process, second stage boot loader 239 includes logic to read the file (e.g., a configuration file, etc.) that indicates whether the disaster recovery service was invoked during the previous operating cycle of device 150. According to another exemplary implementation, second stage boot loader 239 includes logic to cause a reboot of device 150. In this way, device 150 may abandon the non-deterministic state stemming from second stage boot loader 239 not detecting that the disaster recovery service was invoked.

When it is determined that the disaster recovery service is not invoked (block 725—NO), the boot-up process may continue or a reboot is invoked (block 730). For example, with reference to FIG. 5B, the boot-up process may continue at block 558 in which second stage boot loader 239 continues to execute it instructions and loads the operating system (e.g., operating system 252 of storage area 250). This may occur when device 150 has not received an upgrade and is operating using the initially installed boot loaders and operating system. According to another exemplary implementation, process 700 may invoke a reboot. For example, referring to FIG. 5E, block 567, second stage boot loader 239 includes logic to invoke a reboot. During the reboot of device 150, in block 569, the disaster recovery operating system is loaded and executed. For example, as described herein, first stage boot loader 237 and second stage boot loader 239 may execute, followed by the loading and executing of disaster recovery operating system 262.

When it is determined that the disaster recovery service is invoked (block 725—YES), the disaster recovery operating system is executed (block 735). For example, second stage boot loader 239 loads disaster recovery operating system 262 and disaster recovery operating system 262 begins to execute.

Referring to FIG. 7B, block 740, the upgraded platform software is downloaded and stored. For example, disaster recovery operating system 262 and/or updater 155 download and store upgraded platform software from device 110, in a manner previously described. For example, the upgraded platform software may include the upgraded second stage boot loader and the upgraded operating system. The upgraded second stage boot loader may be stored in storage areas 240 and 245, and the upgraded operating system may be stored in storage area 255.

In block 745, the file is updated. For example, disaster recovery operating system 262 and/or updater 155 update the file to indicate a successful download and storage of the upgraded platform software.

Although FIGS. 7A and 7B illustrate an exemplary process 700 of the disaster recovery service, according to other embodiments, process 700 may include additional operations, fewer operations, and/or different operations than those illustrated in FIGS. 7A and 7B and described herein.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks have been described with regard to the processes illustrated in FIGS. 5A-5E, 7A, and 7B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in different forms. The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages. A process or a function may be implemented as "logic" or as a "component."

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

No element, act, or instruction described in the present application should be construed as critical or essential to the embodiments described herein unless explicitly described as such.

What is claimed is:

1. A method comprising:
   executing, by a device, a first stage boot loader during a boot-up of the device;
   determining, by the device, whether a disaster recovery service is invoked based on the first stage boot loader reading a first file that indicates whether the disaster recovery service was invoked during a previous cycle of the device and the first stage boot loader detecting a position of a button of the device;
   executing, by the device, a second stage boot loader in response to determining that the disaster recovery service is invoked;
   determining, by the device, whether the disaster recovery service is invoked based on the second stage boot loader reading the first file that indicates whether the disaster recovery service was invoked during the previous cycle of the device and the second stage boot loader detecting the position of the button; and
   rebooting, by the device, in response to determining that the disaster recovery service is not invoked.

2. The method of claim 1, wherein the first stage boot loader is not upgradeable.

3. The method of claim 1, wherein the rebooting comprises:
   executing, by the device, a first operating system that is write protected.

4. The method of claim 1, further comprising:
   downloading, by the device, an upgraded second stage boot loader and an upgraded operating system relative to a second operating system;
   storing, by the device, the upgraded second stage boot loader and the upgraded second operating system; and
   updating, by the device, a second file, wherein the second file indicates that the upgraded second stage boot loader and the upgraded second operating system are available for execution during a next boot-up of the device.

5. The method of claim 4, wherein the downloading and the storing of the upgraded second stage boot loader and the upgraded second operating system is executed by a first operating system.

6. The method of claim 1, further comprising:
   determining, by the device subsequent to the rebooting, that the disaster recover service is invoked; and executing, by the device, a first operating system that is write protected.

7. The method of claim 1, further comprising:
determining, by the device, that the disaster recovery service is not invoked based on the second stage boot loader detecting that the button is not in a depressed position.

8. The method of claim 1, wherein the first file is a system file that includes data indicating a date and a timestamp of when the disaster recovery service was invoked.

9. A device comprising:
a processor, wherein the processor is configured to:
execute a first stage boot loader during a boot-up of the device;
determine whether a disaster recovery service is invoked based on the first stage boot loader reading a first file that indicates whether the disaster recovery service was invoked during a previous cycle of the device and the first stage boot loader detecting a position of a button of the device;
execute a second stage boot loader in response to a determination that the disaster recovery service is invoked;
determine whether the disaster recovery service is invoked based on the second stage boot loader reading the first file that indicates whether the disaster recovery service was invoked during the previous cycle of the device and the second stage boot loader detecting the position of the button; and
reboot in response to a determination that the disaster recovery service is not invoked.

10. The device of claim 9, wherein the first stage boot loader is not upgradeable.

11. The device of claim 9, wherein when rebooting, the processor is further configured to:
execute a first operating system that is write protected.

12. The device of claim 9, wherein the processor is further configured to:
download an upgraded second stage boot loader and an upgraded operating system relative to a second operating system;
store the upgraded second stage boot loader and the upgraded second operating system; and
update a second file, wherein the second file indicates that the upgraded second stage boot loader and the upgraded second operating system are available for execution during a next boot-up of the device.

13. The device of claim 12, wherein the downloading and the storing of the upgraded second stage boot loader and the upgraded second operating system is executed by a second first operating system.

14. The device of claim 9, wherein the processor is further configured to:
determine, subsequent to the rebooting, that the disaster recover service is invoked; and
execute a first operating system that is write protected.

15. The device of claim 9, wherein the processor is further configured to:
determine that the disaster recovery service is not invoked based on the second stage boot loader detecting that the button is not in a depressed position.

16. The device of claim 9, wherein the first file is a system file that includes data indicating a date and a timestamp of when the disaster recovery service was invoked.

17. A non-transitory computer-readable storage medium storing instructions executable by a processor of a device, which when executed cause the device to:
execute a first stage boot loader during a boot-up of the device;
determine whether a disaster recovery service is invoked based on the first stage boot loader reading a first file that indicates whether the disaster recovery service was invoked during a previous cycle of the device and the first stage boot loader detecting a position of a button of the device;
execute a second stage boot loader in response to a determination that the disaster recovery service is invoked;
determine whether the disaster recovery service is invoked based on the second stage boot loader reading the first file that indicates whether the disaster recovery service was invoked during the previous cycle of the device and the second stage boot loader detecting the position of the button; and
reboot in response to a determination that the disaster recovery service is not invoked.

18. The non-transitory, computer-readable storage medium of claim 17, wherein the first stage boot loader is not upgradeable.

19. The non-transitory, computer-readable storage medium of claim 17, wherein the instructions to reboot further comprise instructions to:
execute a first operating system that is write protected.

20. The non-transitory, computer-readable storage medium of claim 17, wherein the first file is a system file that includes data indicating a date and a timestamp of when the disaster recovery service was invoked.

* * * * *